US011343073B2

(12) United States Patent
Oh et al.

(10) Patent No.: US 11,343,073 B2
(45) Date of Patent: May 24, 2022

(54) APPARATUS AND METHOD FOR ACHIEVING DISTRIBUTED CONSENSUS BASED ON DECENTRALIZED BYZANTINE FAULT TOLERANCE

(71) Applicant: ELECTRONICS AND TELECOMMUNICATIONS RESEARCH INSTITUTE, Daejeon (KR)

(72) Inventors: Jin-Tae Oh, Daejeon (KR); Joon-Young Park, Daejeon (KR); Ki-Young Kim, Daejeon (KR); Dong-Oh Kim, Daejeon (KR); Young-Chang Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 163 days.

(21) Appl. No.: 16/903,057

(22) Filed: Jun. 16, 2020

(65) Prior Publication Data

US 2020/0403776 A1 Dec. 24, 2020

(30) Foreign Application Priority Data

Jun. 18, 2019 (KR) .................. 10-2019-0072201
May 22, 2020 (KR) .................. 10-2020-0061517

(51) Int. Cl.
*H04L 29/06* (2006.01)
*H04L 9/06* (2006.01)
(Continued)

(52) U.S. Cl.
CPC ........ *H04L 9/0637* (2013.01); *G06F 11/2005* (2013.01); *H04L 9/085* (2013.01);
(Continued)

(58) Field of Classification Search
None
See application file for complete search history.

(56) References Cited

U.S. PATENT DOCUMENTS

| 2018/0198794 | A1 | 7/2018 | Huh et al. |
| 2019/0097790 | A1* | 3/2019 | Li ............... H04L 9/085 |
| 2019/0182029 | A1 | 6/2019 | Yim et al. |
| 2019/0327084 | A1 | 10/2019 | Oh et al. |
| 2019/0379538 | A1 | 12/2019 | |

FOREIGN PATENT DOCUMENTS

| KR | 20190054738 A | 5/2019 |
| KR | 20190122149 A | 10/2019 |
| KR | 20190140826 A | 12/2019 |

OTHER PUBLICATIONS

Jian Liu et al. "Scalable Byzantine Consensus via Hardware-Assisted Secret Sharing," IEEE Transactions on Computers, vol. 68, No. 1, pp. 139-151, Jan. 2019 (Year: 2019).*
Yin Yang, "LinBFT: Linear-Communication Byzantine Fault Tolerance for Public Blockchains", Computer Science; arXiv preprint arXiv:1807.01829; Jul. 5, 2018, pp. 1-8 (Year: 2018).*

(Continued)

*Primary Examiner* — Andrew J Steinle

(57) ABSTRACT

Disclosed herein are an apparatus and method for achieving distributed consensus based on decentralized Byzantine fault tolerance. The apparatus may include one or more processors and an execution memory for storing at least one program that is executed by the one or more processors, wherein the program is configured to receive delegate request messages, each including a first transaction for requesting distributed consensus proposed by a client, and determine congress candidate nodes forming a consensus quorum, to be consensus nodes based on the delegate request messages, generate a prepare message that includes a second transaction for obtaining consent to results of determination of the consensus nodes, and send the prepare message to the (Continued)

consensus nodes, and receive commit messages, each including an electronic signature of a corresponding consensus node, from the respective consensus nodes, and broadcast a reply message indicative of results of verification of the electronic signatures.

20 Claims, 13 Drawing Sheets

(51) Int. Cl.
    *H04L 9/30*     (2006.01)
    *H04L 9/08*     (2006.01)
    *G06F 11/20*     (2006.01)
    *H04L 9/32*     (2006.01)

(52) U.S. Cl.
    CPC .............. *H04L 9/30* (2013.01); *H04L 9/3247* (2013.01); *H04L 63/123* (2013.01); *H04L 2209/38* (2013.01)

(56) References Cited

OTHER PUBLICATIONS

Ittai Abraham et al, "Solida: A Blockchain Protocol Based on Reconfigurable Byzantine Consensus", arXiv preprint arXiv: 1612.02916; Dec. 6, 2016, pp. 1-17 (Year: 2016).*

Jian Liu et al. "Scalable Byzantine Consensus via Hardware-Assisted Secret Sharing," IEEE Transactions on Computers, vol. 68, No. 1, pp. 139-151, Jan. 2019.

Du Mingxiao et al, "A Review on Consensus Algorithm of Blockchain", 2017 IEEE International Conference on Systems, Man, and Cybernetics(SMC), Oct. 5, 2017, pp. 2567-2572.

Fin Yang, "LinBFT: Linear-Communication Byzantine Fault Tolerance for Public Blockchains", Computer Science; arXiv preprint arXiv:1807.01829; Jul. 5, 2018, pp. 1-8.

Ittai Abraham et al, "Solida: A Blockchain Protocol Based on Reconfigurable Byzantine Consensus", arXiv preprint arXiv:1612.02916; Dec. 6, 2016, pp. 1-17.

* cited by examiner $key\ generation\ (sk_i, pk_i) \in \{1, p-1\}, pk_i = sk_i G$
$signing\ message\ Msg$
    $Select\ k_i\ in\{1, p-1\}$
    $Q_i = k_i G$
    $Pk = \sum_{i=1}^{n} pk_i$
    $Q = \sum_{i=1}^{n} Q_i$
    $r = H(Pk \parallel Q \parallel Msg) mod p$
    $s_i = k_i - rsk_i mod p$
    $S = \sum_{i=1}^{n} s_i$
    $Signature: (r, S)$ $Verify$
    $Q = SG + rPk$
    $v = H(Pk \parallel Q \parallel Msg) mod p$
    $if(v = r)\ return\ 1,\ else\ 0$

FIG. 8

*partial signature varification*
*merge partial sign*
$$Pk_{par} = pk_i + pk_j$$
$$Q_{par} = Q_i + Q_j$$
$$r = H(Pk \parallel Q \parallel Msg) \bmod p$$
$$S_{par} = s_i + s_j$$
$$Signature: (r, S_{par})$$

*Verify*
$$Q_{var} = S_{par}G + rPk_{par}$$
$$if(Q_{par} = Q_{var}) \ return \ 1, \ else \ 0$$

FIG. 9

APPARATUS AND METHOD FOR ACHIEVING DISTRIBUTED CONSENSUS BASED ON DECENTRALIZED BYZANTINE FAULT TOLERANCE

CROSS REFERENCE TO RELATED APPLICATIONS

This application claims the benefit of Korean Patent Application Nos. 10-2019-0072201, filed Jun. 18, 2019 and 10-2020-0061517, filed May 22, 2020, which are hereby incorporated by reference in their entireties into this application.

BACKGROUND OF THE INVENTION

1. Technical Field

The present invention relates generally to blockchain technology, and more particularly, to technology for optimizing distributed consensus protocols and messages based on Byzantine Fault Tolerance (BFT) of decentralized nodes.

2. Description of the Related Art

Byzantine fault tolerance (BFT) is a technique which enables nodes to operate normally in a distributed environment composed of multiple nodes even if an abnormal node is present in the distributed environment. A conventional Byzantine-fault-tolerance-based distributed consensus scheme requires the exchange of $O(N^2)$ messages during a consensus process. A conventional Byzantine-fault-tolerance-based distributed consensus scheme is limited in increasing the number of nodes that participate in a consensus process due to the number of messages. In the case of a Tendermint algorithm, the number of nodes that participate in consensus is assumed to be 101. During a consensus process, the exchange of $O(N^2)$ messages is required, and thus various types of research into reducing the number of messages to be exchanged have been conducted. In the case of FastBFT, the number of messages to be exchanged has been reduced to $O(N)$ through message aggregation technology. Further, in the case of Zilliqa or the like, there are conventional technologies that reduce the number of messages to $O(N)$ using multiple signatures. However, the conventional technologies have succeeded in reducing the number of consensus messages to $O(N)$, but there are limitations in that the nodes that participate in a consensus process are fixed, which forms again centralization. Therefore, in conventional technologies, decentralization of nodes has been realized, but the exchange of $O(N^2)$ messages is required in order to achieve consensus. Due to this limitation, conventional technologies for realizing decentralization of nodes may be problematic in that, when the number of nodes increases to several hundred or higher, a problem of traffic congestion may occur, and thus a new consensus method that is capable of reducing the number of consensus messages to $O(N)$ is required.

Meanwhile, Korean Patent Application Publication No. 10-2019-0122149 entitled "Method for Selecting Consensus Node Using Nonce, and Method and Apparatus for Generating Blockchain Using the Same" discloses a method and apparatus for generating a blockchain, which allow only some of all nodes that participate in distributed consensus to participate therein, thus minimizing the consumption of resources and guaranteeing the selection of a predetermined number or more of consensus nodes.

SUMMARY OF THE INVENTION

Accordingly, the present invention has been made keeping in mind the above problems occurring in the prior art, and an object of the present invention is to provide a distributed consensus method that allows decentralized nodes to achieve consensus through the exchange of $O(N)$ messages while accepting Byzantine fault tolerance (BFT).

Another object of the present invention is to enable fast computation while reducing the number of messages to be exchanged and preventing unqualified nodes from participating in distributed consensus, thus allowing a large number of decentralized nodes to rapidly realize consensus.

In accordance with an aspect of the present invention to accomplish the above objects, there is provided an apparatus for achieving distributed consensus based on decentralized Byzantine fault tolerance, including one or more processors; and an execution memory for storing at least one program that is executed by the one or more processors, wherein the at least one program is configured to receive delegate request messages, each including a first transaction for requesting distributed consensus proposed by a client, from congress candidate nodes in a blockchain, and determine congress candidate nodes forming a consensus quorum, among the congress candidate nodes, to be consensus nodes based on the delegate request messages, generate a prepare message that includes a second transaction for obtaining consent to results of determination of the consensus nodes from the consensus nodes, and send the prepare message to the consensus nodes, and receive commit messages, each including an electronic signature of a corresponding consensus node, in response to the prepare message from the respective consensus nodes, and broadcast a reply message indicative of results of verification of the electronic signatures included in the commit messages, to the congress candidate nodes, thus completing distributed consensus, wherein the consensus quorum is 2f+1, where f is an integer of 1 or more, f satisfies both a first condition and a second condition, the first condition is a condition satisfied in a case where, when the congress candidate nodes are selected from among all nodes of the blockchain with a probability of p (where p is a real number that is equal to or greater than 0 and is less than or equal to 1), a first probability that a number of Byzantine nodes to be selected as the congress candidate nodes will be greater than f is less than or equal to a preset first reference probability, and the second condition is a condition satisfied in a case where a second probability that a number of congress candidate nodes will be less than or equal to 3f is less than or equal to a preset second reference probability.

The at least one program may be configured to receive the delegate request messages along with next consensus group messages, each including information indicating whether a corresponding node has been selected as the congress candidate node, from all nodes, and when a number of nodes that sent the next consensus group messages is 3f+1 or more, select 3f+1 nodes and determine the selected nodes to be the congress candidate nodes for a next distributed consensus, whereas when the number of nodes that sent the next consensus group messages is less than or equal to 3f, not update the congress candidate nodes.

The at least one program may be configured to, when a number of delegate request messages forming the consensus quorum are received, determine the second transaction based on identical f+1 first transactions included in the delegate request messages forming the consensus quorum.

The at least one program may be configured to generate first bitmap information corresponding to the first transactions of the congress candidate nodes and second bitmap information including the results of determination of the consensus nodes, and to generate the prepare message including the first bitmap information, the second bitmap information, and the second transaction.

Each of the consensus nodes may check a validity of the prepare message based on whether the first bitmap information corresponds to the second transaction.

The at least one program may be configured to generate a first aggregated public key and a first aggregated quorum value by respectively aggregating public keys and quorum values included in the delegate request messages, and to generate the prepare message further including a first hash value obtained by hashing the first aggregated public key and the first aggregated quorum value.

Each of the consensus nodes may be configured to generate a second aggregated public key and a second aggregated quorum value by respectively aggregating previously registered public keys and previously registered quorum values, and to compare a second hash value, obtained by hashing the second aggregated public key and the second aggregated quorum value, with the first hash value as to whether the second hash value is identical to the first hash value, thus checking the validity of the prepare message.

Each of the consensus nodes may be configured to, when the second hash value is identical to the first hash value, generate a signature value including the first hash value and a secret value prestored in the corresponding consensus node, include the signature value in the prepare message, and generate a corresponding commit message by adding the electronic signature based on the signature value to the prepare message.

The at least one program may be configured to generate a multi-signature from the electronic signatures by respectively aggregating the signature values included in the commit messages, public keys of the first aggregated public key, and quorum values of the first aggregated quorum value in a form of a signature value tree of the multi-signature, a public key tree of the multi-signature, and a quorum value tree of the multi-signature.

The at least one program may be configured to, when a result of verification of the multi-signature is true, generate the reply message including the second transaction and the multi-signature.

In accordance with another aspect of the present invention to accomplish the above objects, there is provided a method for achieving distributed consensus based on decentralized Byzantine fault tolerance, the method being performed by an apparatus for achieving distributed consensus based on decentralized Byzantine fault tolerance, the method including receiving delegate request messages, each including a first transaction for requesting distributed consensus proposed by a client, from congress candidate nodes in a blockchain, and determining congress candidate nodes forming a consensus quorum, among the congress candidate nodes, to be consensus nodes based on the delegate request messages, generating a prepare message that includes a second transaction for obtaining consent to results of determination of the consensus nodes from the consensus nodes, and sending the prepare message to the consensus nodes, and receiving commit messages, each including an electronic signature of a corresponding consensus node, in response to the prepare message from the respective consensus nodes, and broadcasting a reply message indicative of results of verification of the electronic signatures included in the commit messages, to the congress candidate nodes, thus completing distributed consensus, wherein the consensus quorum is 2f+1, where f is an integer of 1 or more, f satisfies both a first condition and a second condition, the first condition is a condition satisfied in a case where, when the congress candidate nodes are selected from among all nodes of the blockchain with a probability of p (where p is a real number that is equal to or greater than 0 and is less than or equal to 1), a first probability that a number of Byzantine nodes to be selected as the congress candidate nodes will be greater than f is less than or equal to a preset first reference probability, and the second condition is a condition satisfied in a case where a second probability that a number of congress candidate nodes will be less than or equal to 3f is less than or equal to a preset second reference probability.

Determining the congress candidate nodes to be the consensus nodes may be configured to receive the delegate request messages along with next consensus group messages, each including information indicating whether a corresponding node has been selected as the congress candidate node, from all nodes, and when a number of nodes that sent the next consensus group messages is 3f+1 or more, select 3f+1 nodes and determine the selected nodes to be the congress candidate nodes for a next distributed consensus, whereas when the number of nodes that sent the next consensus group messages is less than or equal to 3f, not update the congress candidate nodes.

Determining the congress candidate nodes to be the consensus nodes may be configured to, when a number of delegate request messages forming the consensus quorum are received, determine the second transaction based on identical f+1 first transactions included in the delegate request messages forming the consensus quorum.

Sending the prepare message may be configured to generate first bitmap information corresponding to the first transactions of the congress candidate nodes and second bitmap information including the results of determination of the consensus nodes, and to generate the prepare message including the first bitmap information, the second bitmap information, and the second transaction.

Sending the prepare message may be configured such that each of the consensus nodes checks a validity of the prepare message based on whether the first bitmap information corresponds to the second transaction.

Sending the prepare message may be configured to generate a first aggregated public key and a first aggregated quorum value by respectively aggregating public keys and quorum values included in the delegate request messages, and to generate the prepare message further including a first hash value obtained by hashing the first aggregated public key and the first aggregated quorum value.

Sending the prepare message may be configured to generate a second aggregated public key and a second aggregated quorum value by respectively aggregating previously registered public keys and previously registered quorum values, and to compare a second hash value, obtained by hashing the second aggregated public key and the second aggregated quorum value, with the first hash value as to whether the second hash value is identical to the first hash value, thus checking the validity of the prepare message.

Completing the distributed consensus may be configured to, when the second hash value is identical to the first hash value, generate a signature value including the first hash value and a secret value prestored in the corresponding consensus node, include the signature value in the prepare message, and generate a corresponding commit message by adding the electronic signature based on the signature value to the prepare message.

Completing the distributed consensus may be configured to generate a multi-signature from the electronic signatures by respectively aggregating the signature values included in the commit messages, public keys of the first aggregated public key, and quorum values of the first aggregated quorum value in a form of a signature value tree of the multi-signature, a public key tree of the multi-signature, and a quorum value tree of the multi-signature.

Completing the distributed consensus may be configured to, when a result of verification of the multi-signature is true, generate the reply message including the second transaction and the multi-signature.

BRIEF DESCRIPTION OF THE DRAWINGS

The above and other objects, features and advantages of the present invention will be more clearly understood from the following detailed description taken in conjunction with the accompanying drawings, in which:

FIG. 8 is a diagram illustrating a multi-signature according to an embodiment of the present invention;

FIG. 9 is a diagram illustrating partial multi-signature verification according to an embodiment of the present invention;

DESCRIPTION OF THE PREFERRED EMBODIMENTS

Figure 1:
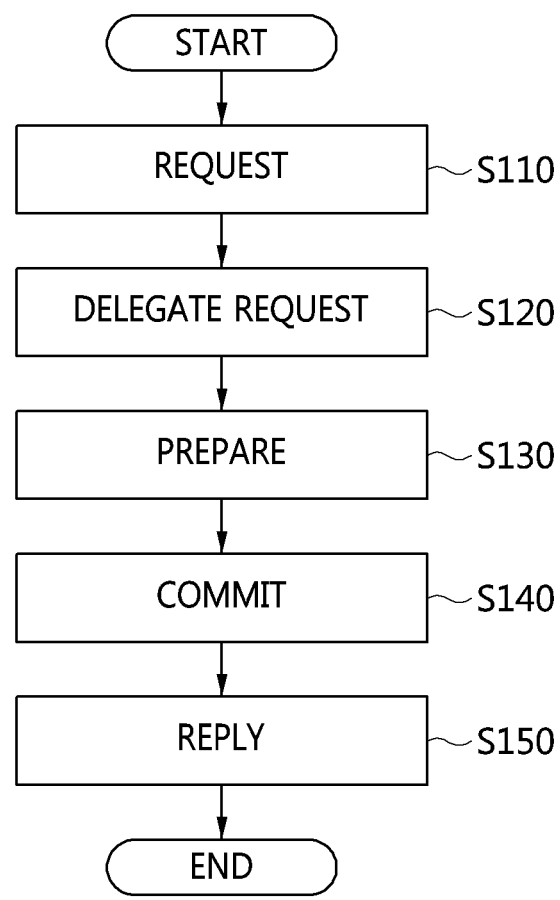
FIG. 1 is an operation flowchart illustrating a method for achieving distributed consensus based on decentralized Byzantine fault tolerance according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the attached drawings.

Figure 2:
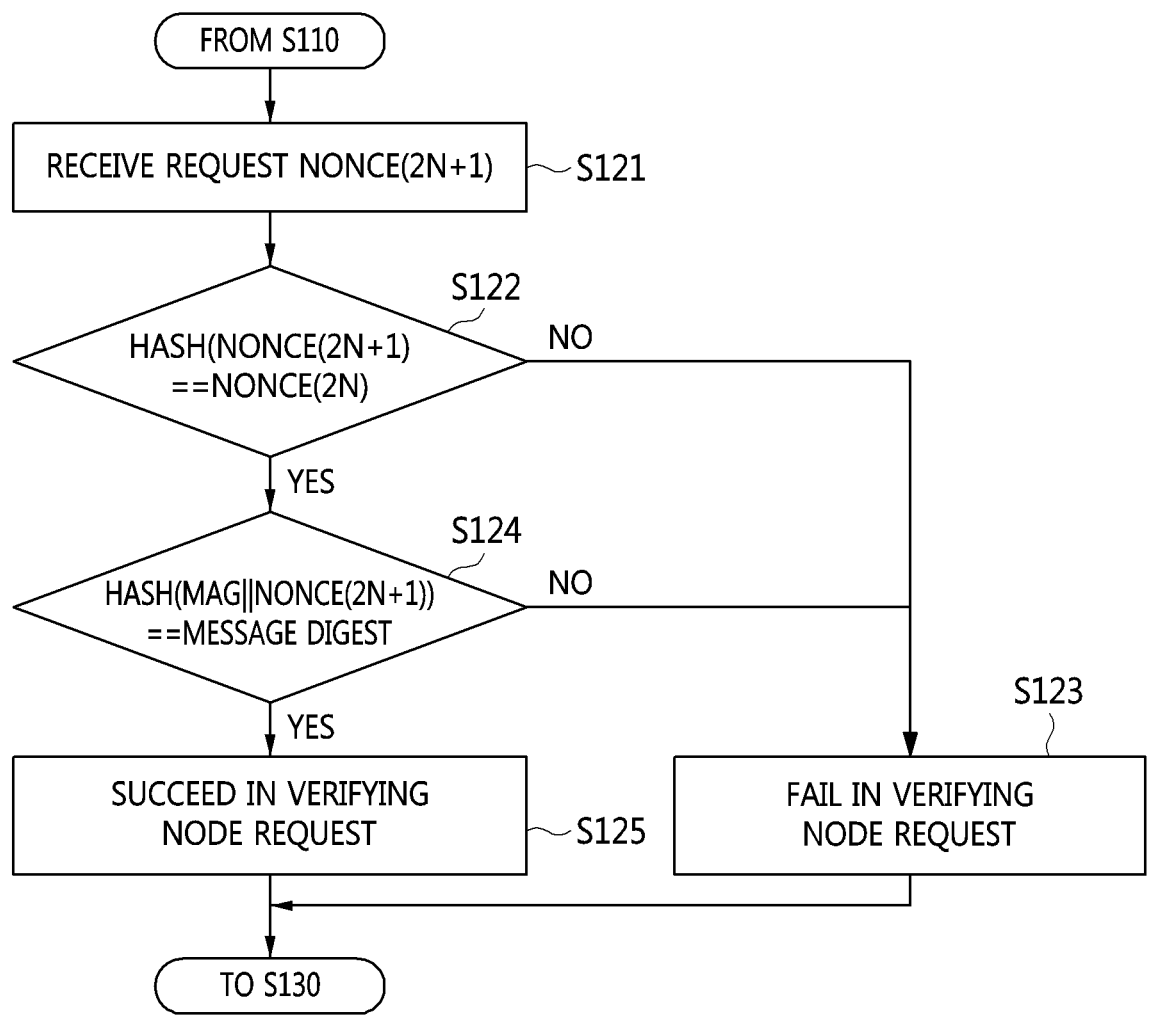
FIG. 2 is an operation flowchart illustrating in detail an example of the DELEGATE REQUEST phase illustrated in FIG. 1.

FIG. 1 is an operation flowchart illustrating a method for achieving distributed consensus based on decentralized Byzantine fault tolerance according to an embodiment of the present invention. FIG. 2 is an operation flowchart illustrating in detail an example of the DELEGATE REQUEST phase illustrated in FIG. 1.

Referring to FIG. 1, the method for achieving distributed consensus based on decentralized Byzantine fault tolerance according to an embodiment of the present invention first performs a "REQUEST" phase, in which a client requests distributed consensus from congress candidate nodes, at step S110.

The client is an entity that generates a REQUEST, which may correspond to a transaction to be processed. A transaction message to be processed may also include a means for verifying integrity thereof, such as an electronic signature.

Further, in a blockchain network according to the embodiment of the present invention, the nodes may include multiple servers.

For example, the multiple servers may include SERVER 0 to SERVER 3. SERVERS 0 to 3 may be congress members for a block on which consensus is currently being reached. Here, SERVER 0 may be configured using one server, but each of SERVER 1 to SERVER 3 may be configured using one or more (e.g., f) servers, where f>=1. The congress members may be changed for each block.

Here, SERVER 0 may be a main node (i.e., a transmitting-side server) corresponding to an apparatus for achieving distributed consensus based on decentralized Byzantine fault tolerance according to an embodiment of the present invention.

Here, each of SERVERS 1 to 3 may be a sub-node (i.e., a receiving-side server) which receives a REQUEST message from the client according to an embodiment of the present invention and transfers a DELEGATE REQUEST message to SERVER 0.

That is, at step S110, the client may broadcast a REQUEST message, including a first transaction which requests distributed consensus, to congress candidate nodes in a blockchain.

Also, the method for achieving distributed consensus based on decentralized Byzantine fault tolerance according to the embodiment of the present invention may perform a "DELEGATE REQUEST" phase, in which delegate request messages are received, at step S120.

That is, at step S120, DELEGATE REQUEST messages, each including a first transaction which requests the processing of transactions requested to be processed by the client, are received from congress candidate nodes in the blockchain, and congress candidate nodes forming a consensus quorum, among the congress candidate nodes, may be determined to be consensus nodes based on the DELEGATE REQUEST messages.

Here, in accordance with an embodiment of the present invention, nodes that obtain the opportunity to directly participate in reaching consensus on a specific height block may be referred to as 'congress members', and the minimum number of nodes required for a vote, among the congress members, may be referred to as a 'consensus quorum (or a quorum)'.

The consensus quorum may be 2f+1 (where f is an integer of 1 or more), and f may satisfy both a first condition and a second condition. Here, the first condition may be a condition satisfied in the case where, when the congress candidate nodes are selected from among all nodes of the blockchain at a probability of p (where p is a real number that is equal to or greater than 0 and is less than or equal to 1), a first probability that the number of Byzantine nodes to be selected as the congress candidate nodes will be greater than f is less than or equal to a preset first reference probability. The second condition may be a condition satisfied in the case where, when the same congress candidate nodes are selected from among all nodes of the blockchain at a probability of p (where p is a real number that is equal to or greater than 0 and is less than or equal to 1), a second probability that the number of congress candidate nodes will be less than or equal to 3f is less than or equal to a preset second reference probability.

For example, it may be assumed that n is the total number of nodes, $b_p$ is the ratio of Byzantine nodes to all nodes, b is the number of Byzantine nodes, and p is the probability that a coin will come up heads in the case where a node, for which the coin comes up heads when coin flipping is conducted, is selected.

Here, when n is 1000 and $b_p$ is 0.2 (i.e. when 20% of all nodes are Byzantine nodes), b is calculated as 200 (b=n*$b_p$=1,000*0.2=200).

For example, it is assumed that, when all of n participating nodes flip a coin that is biased so as to have a probability of coming up heads of 0.1 once, nodes for which the coin comes up heads are selected as congress candidates.

At this time, since the number of nodes for which the coin comes up heads follows a binomial distribution, the average number is calculated as n*p, that is, 100.

Here, since the number of nodes is sufficiently large (30 or more), the probability that a particular node will be selected may approach a normal distribution by means of a "central limit theorem", but may precisely follow a binomial distribution.

When coin-flipping operations conducted by respective nodes are independent of each other (i.e., when the coin flipped by each node is not influenced by the results of coin flipping conducted by a previous node, the operations are independent of each other), some of the nodes may be classified into groups, and only the distribution of the probabilities that the groups will be selected may be separately calculated.

Therefore, when only Byzantine nodes (b) of all nodes (n) flip a coin having a probability p of coming up heads, the cumulative probability of the number k of Byzantine nodes for which the coin comes up heads being less than or equal to f may be calculated using the following Equation (1) (cumulative probability for binomial distribution).

$$\sum_{k=0}^{f} \binom{b}{k} p^k (1-p)^{b-k} \quad (1)$$

Here, Equation (2) may satisfy the condition in which, when Byzantine nodes flip a coin having a probability p of coming up heads, the probability that the number k of Byzantine nodes for which the coin comes up heads will be greater than f is less than or equal to $P_{max\_bzt}$.

$$1 - \sum_{k=0}^{f} \binom{b}{k} p^k (1-p)^{b-k} \leq P_{max\_bzt} \quad (2)$$

Here, 1.1 e-16=$P_{max\_bzt}$ may be satisfied. This value is not a fixed value, but another value (e.g., 5e-9 or the like) may be used depending on the system design.

Further, the condition in which the cumulative probability that the number x of nodes for which, when all of n participating nodes flip a coin having the same probability p, the coin comes up heads will be less than or equal to 3f, is less than or equal to $P_{min\_node}$ may be represented by the following Equation (3):

$$\sum_{x=0}^{3f} \binom{n}{x} p^x (1-p)^{n-x} \leq P_{min\_node} \quad (3)$$

When the total number of participating nodes n is given, p satisfying both Equations (2) and (3) while increasing the node selection probability may be calculated. When nodes conduct coin flipping at the calculated probability of p, and 3f+1 nodes, among the nodes for which the coin come up heads, are randomly set as congress members, the probability that the number of Byzantine nodes included in the congress members will be greater than f may be maintained at $P_{max\_bzt}$ or lower.

For example, it may be considered that the total number of nodes n=1,000, Byzantine proportion bp=0.2, the number of Byzantine nodes b=n*bp=1,000*0.2=200, $P_{max\_bzt}$=1.1e-16, and $P_{min\_node}$=1.0e-6. In this case, when the node selection probability p is increased from 0 and p satisfying both Equations (2) and (3) is calculated, it is assumed that Equations (2) and (3) are satisfied at p=0.1. At this time, when each node conducts coin flipping to check whether the node itself has been selected, if the coin-flipping operations by the nodes are independent of each other, the average number of nodes selected from among 200 Byzantine nodes may be 20 (since the node selection probability p is 0.1, the average number=b*p=200*0.1=20).

In Equation (2), since the probability that the number of nodes for which the coin comes up heads, among 200 Byzantine nodes, will be greater than 30 is very low, it may be determined that the probability is less than or equal to $P_{maz\_bzt}$.

Here, when a total of 1,000 nodes conduct coin flipping, the average number of nodes for which the coin comes up heads may be 100.

Here, when the probability that the coin will come up heads for 90 or fewer nodes can be calculated as a value less than $P_{min\_node}$, in the case where all nodes conduct coin flipping, and 91 nodes are randomly selected from among the nodes for which the coin comes up heads and are then set as congress members, the probability that the number of Byzantine nodes included in the 91 nodes will be greater than 30 may still be less than or equal to $P_{max\_bzt}$.

The reason for this is that the probability that, when 200 Byzantine nodes conduct coin flipping at a node selection probability of 0.1, 30 or more Byzantine nodes will be selected is less than or equal to $P_{max\_bzt}$.

That is, all nodes in the blockchain according to the embodiment of the present invention may calculate the total number of cases where the proportion of the number of Byzantine nodes included in an arbitrary number of nodes obtained through coin flipping exceeds 33%, and may sum up the results of calculation.

Here, all of the nodes may select the congress members while maintaining the number of Byzantine nodes to a desired number using a method of calculating a number at which the maximum number of Byzantine nodes to be selected does not exceed a preset probability value, setting the calculated number as f, indicative of the number of nodes, and randomly selecting 3f+1 nodes in an environment in which a total of 3f+1 or more nodes can be selected.

Also, at step S120, a congress candidate request message (i.e., DELEGATE REQUEST message), including information indicating whether each of all nodes has been selected as the congress candidate node, may be received from all of the nodes. Here, when the number of nodes that sent the DELEGATE REQUEST message is equal to or greater than 3f+1, 3f+1 nodes may be selected and determined to be congress candidate nodes for the next distributed consensus, whereas, when the number of nodes that sent the DELEGATE REQUEST message is less than or equal to 3f, the congress candidate nodes may not be updated.

Here, at step S120, when a number of DELEGATE REQUEST messages meeting the congress quorum are received, a second transaction may be determined based on the same f+1 first transactions included in a number of DELEGATE REQUEST messages meeting the consensus quorum.

As illustrated in FIG. 2, step S120 may further include the detailed step of checking the validity of the DELEGATE REQUEST messages of congress candidate nodes that sent the DELEGATE REQUEST messages.

Referring to FIG. 2, at step S121, nonce(2N+1) values may be checked in the received DELEGATE REQUEST messages.

At step S122, it may be checked whether a value, obtained by hashing once the nonce(2N+1) value included in each of the DELEGATE REQUEST messages, is equal to the nonce (2N) value of the corresponding congress candidate node previously registered in the congress selection procedure.

Here, at step S122, when the nonce(2N+1) value is not equal to the nonce(2N) value, the corresponding node may fail in a nonce(2N+1) integrity check at step S123.

Here, at step S124, when the corresponding node passes the nonce(2N+1) integrity check, the corresponding node calculates the value of Hash(msg||nonce(2N+1)) so that the integrity of $pk_i$ and $Q_i$, registered by the node, is checked, and may compare the calculated value with the value of message_digest received in the congress selection procedure.

Here, at step S124, when the value of Hash(msg||nonce (2N+1)) is not equal to the value of message_digest, the integrity check of $pk_i$ and $Q_i$ registered by the node may fail at step S123.

At step S123, only when both of the results of integrity checks performed at steps S122 and S124 are successful, the DELEGATE REQUEST from the corresponding node may be accepted, whereas when at least one of the integrity checks at steps S122 and step S124 fails, the DELEGATE REQUEST from the corresponding node may not be accepted.

Here, the integrity check procedure at step S120 may also verify an electronic signature included in each DELEGATE REQUEST message. However, since a time of about 0.1 second is required in order to verify one electronic signature, a delay of several tens of seconds may occur when the number of congresses increases to several hundreds. Further, since a long integrity check time may provide an opportunity for an attacker to launch a DDoS attack, the present invention may provide a fast check through a hash calculation performed twice.

Here, the integrity check procedure at step S120 may determine whether an attack has been launched by a man-in-the-middle attacker without requiring an electronic signature if consecutive hash values are used in a hash chain, thus allowing a device that has received the DELEGATE REQUEST to minimize the cost of validity checks.

Here, the integrity check procedure at step S120 may be performed such that the validity checks of $pk_i$ and $Q_i$ for consensus nodes may be simultaneously performed. Bogus $pk_i$ or bogus $Q_i$ generated by the man-in-the-middle attacker may be repelled.

Furthermore, at step S120, when a node other than a congress candidate node sends a DELEGATE REQUEST message, a message for confirming the results of congress selection must pass a nonce validity check where a value, obtained by hashing the nonce(2N) value of the corresponding node 2N−1 times, should be equal to the nonce(1) value of the corresponding node, and may perform a coupon check of checking whether a coupon is less than a threshold value.

Here, at step S120, when the node does not pass the check, the corresponding node is excluded from congress members for the next block, and the current situation may be recorded in a log.

Here, at step S120, when the number of remaining congress members is greater than the consensus quorum in the situation in which the corresponding node is excluded, a normal consensus may be achieved, whereas when the number of remaining congress members is insufficient, the current congress members may be the congresses for the next block, or empty agreement may be performed.

Further, at step S120, when a man-in-the middle attacker (intermediate transmission node) damages and transfers the DELEGATE REQUEST, whether the DELEGATE REQUEST has been damaged may be checked through message digest.

Since the man-in-the-middle attacker steals the DELEGATE REQUEST of the node and uses a normal nonce (2N), the attacker may pass the nonce validity check and the coupon validity check.

Here, the man-in-the-middle attacker may transfer a message in which the original data is damaged with $pk_i$ or $Q_i$ generated thereby. However, since the man-in-the-middle attacker cannot predict a nonce(2N+1), the attacker cannot pass a message digest check.

Here, at step S120, when the node does not pass the message digest check, the corresponding node is determined to be a man-in-the-middle attacker and is excluded from the congress members, and the current situation may be recorded in a log.

Here, at step S120, when the number of remaining congress members is greater than a consensus quorum in the situation in which the corresponding node is excluded, a normal consensus may be achieved, whereas when the number of remaining congress members is insufficient, the current congress may be a congress for the next block or empty agreement may be performed.

Furthermore, the method for achieving distributed consensus based on decentralized Byzantine fault tolerance according to the embodiment of the present invention may perform a "PREPARE" phase, in which a PREPARE message is sent so as to obtain consent (agreement) to the results of the determination of the consensus nodes from the consensus nodes, at step S130.

That is, at step S130, a PREPARE message that includes a second transaction for obtaining consent to the results of the determination of the consensus nodes from the consensus nodes may be generated, and the PREPARE massage may be sent to the consensus nodes.

Here, at step S130, first bitmap information corresponding to the first transaction of the congress candidate nodes and second bitmap information including the results of determination of the consensus nodes may be generated, and the PREPARE message including the first bitmap information, the second bitmap information, and the second transaction may be generated.

Here, at step S130, the consensus nodes may check the validity of the PREPARE message based on whether the first bitmap information corresponds to the second transaction.

In this case, at step S130, a first aggregated public key and a first aggregated quorum value may be generated by respectively aggregating public keys and quorum values included in the delegate request messages, and the PREPARE message further including a first hash value, obtained by hashing the first aggregated public key and the first aggregated quorum value, may be generated.

Here, at step S130, each of the consensus nodes may generate a second aggregated public key and a second aggregated quorum value by respectively aggregating previously registered public keys and previously registered quorum values, and may compare a second hash value, obtained by hashing the second aggregated public key and the second aggregated quorum value, with the first hash value as to whether the first and second hash values are identical to each other, thus checking the validity of the PREPARE message.

Further, the method for achieving distributed consensus based on decentralized Byzantine fault tolerance according to the embodiment of the present invention may perform a "COMMIT" phase, in which COMMIT messages, each including the electronic signature of the corresponding consensus node, are received from the consensus nodes in response to the PREPARE message, at step S140.

That is, at step S140, in response to the PREPARE message, the COMMIT messages including electronic signatures of respective consensus nodes may be received from the consensus nodes.

At step S140, when the second hash value is identical to the first hash value, each of the consensus nodes may generate the COMMIT message by generating a signature value including the first hash value and a secret value prestored in the corresponding consensus node, by including the signature value in the PREPARE message, and by adding the electronic signature based on the signature value to the PREPARE message.

Here, at step S140, the multi-signature may be generated from the electronic signatures in such a way that the signature values included in the COMMIT messages, public keys of the first aggregated public key, and quorum values of the first aggregated quorum value are respectively aggregated in the form of a signature value tree of a multi-signature, a public key tree of the multi-signature, and a quorum value tree of the multi-signature.

At step S140, the multi-signature may be generated by aggregating the electronic signatures, and a fake electronic signature may be excluded from the electronic signatures by verifying the multi-signature.

Here, at step S140, the signature value tree, the public key tree of the first aggregated public key, and the quorum value tree of the first aggregated quorum value in the multi-signature may be sequentially verified in a tree-step sequence from the top-level step to the bottom-level step.

In detail, at step S140, when, at the current tree step in any one of the trees included in the multi-signature, all of the results of checking values included in a lower-level tree step are abnormal, at least one of electronic signatures included in tree steps lower than the corresponding lower-level tree step may be determined to be a fake electronic signature.

Next, the method for achieving distributed consensus based on decentralized Byzantine fault tolerance according to the embodiment of the present invention may perform a REPLY phase, in which distributed consensus is achieved by broadcasting verification results to the candidate nodes, at step S150.

That is, at step S150, the results of verifying the electronic signatures may be broadcasted to the congress candidate nodes, whereby the distributed consensus may be achieved.

At this time, at step S150, when the result of verification of the multi-signature is true, the reply message including the second transaction and the multi-signature may be generated.

Figure 3:
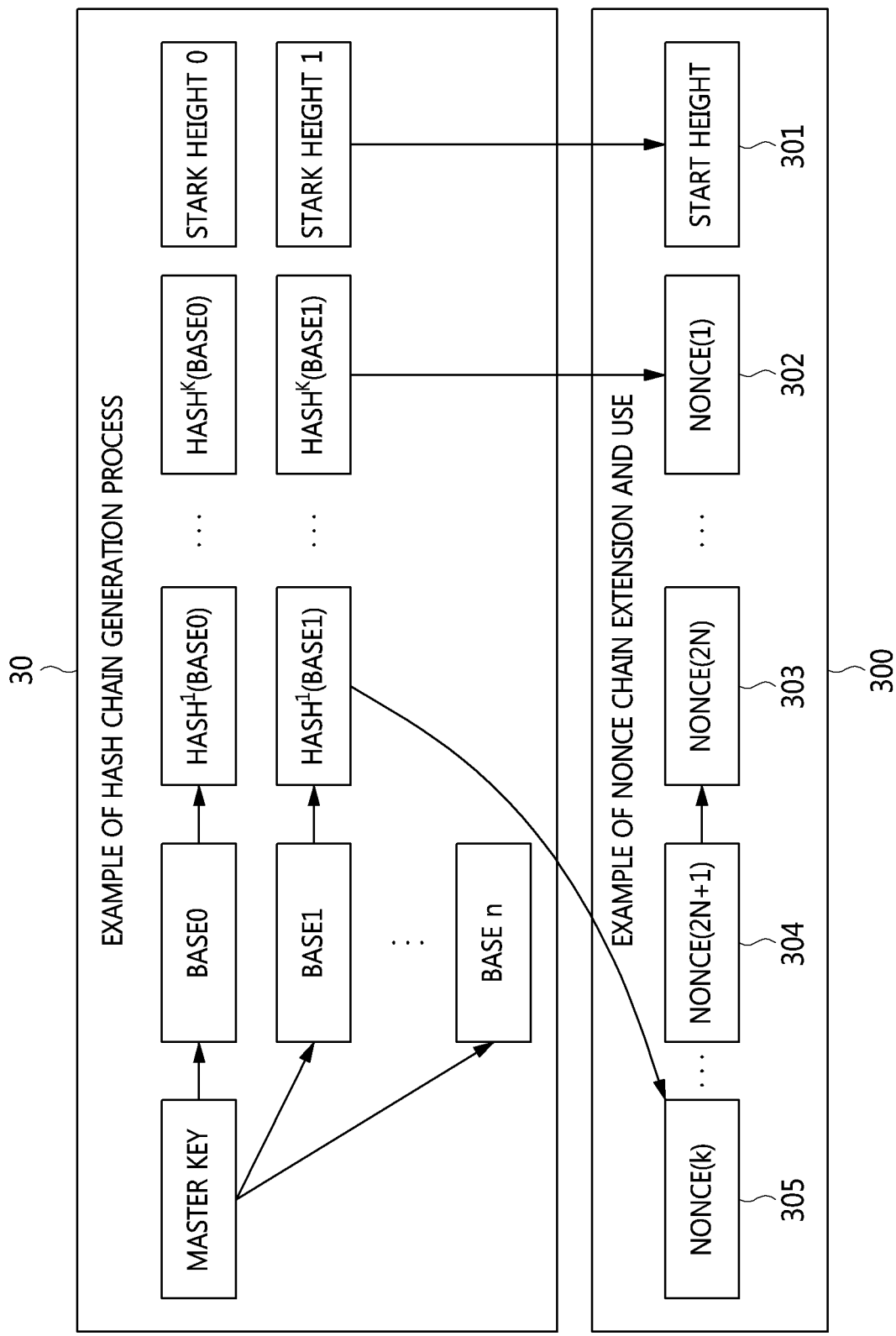
FIG. 3 is a diagram illustrating a hash chain and a nonce chain according to an embodiment of the present invention.
Figure 4:
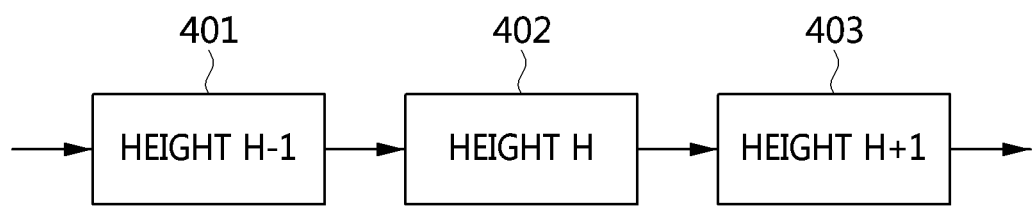
FIG. 4 is a diagram illustrating the heights of blocks according to an embodiment of the present invention.
Figure 5:
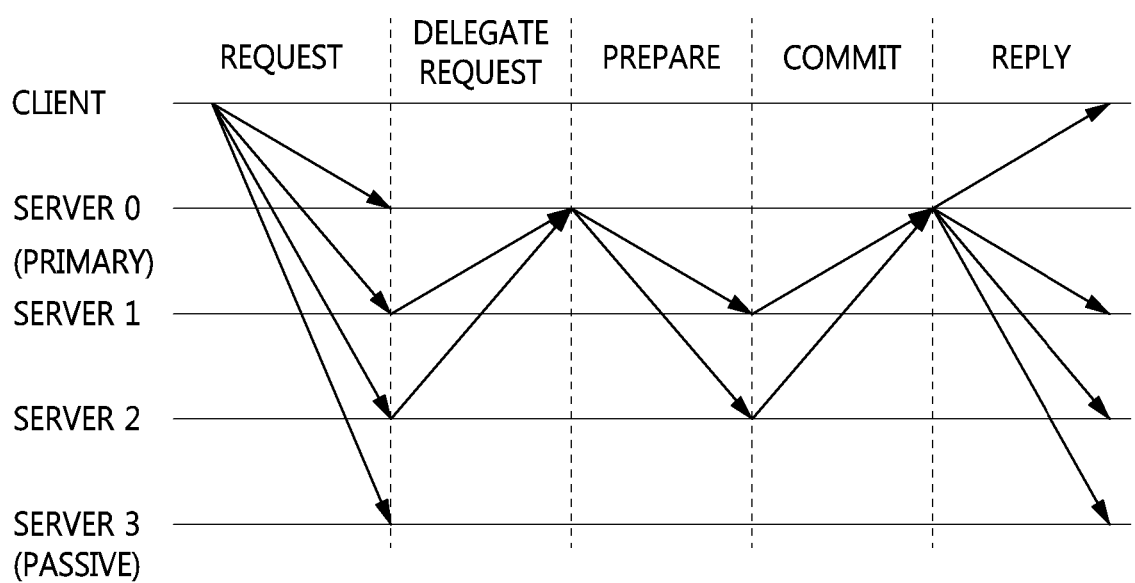
FIG. 5 is a diagram illustrating a distributed consensus protocol according to an embodiment of the present invention.
Figure 6:
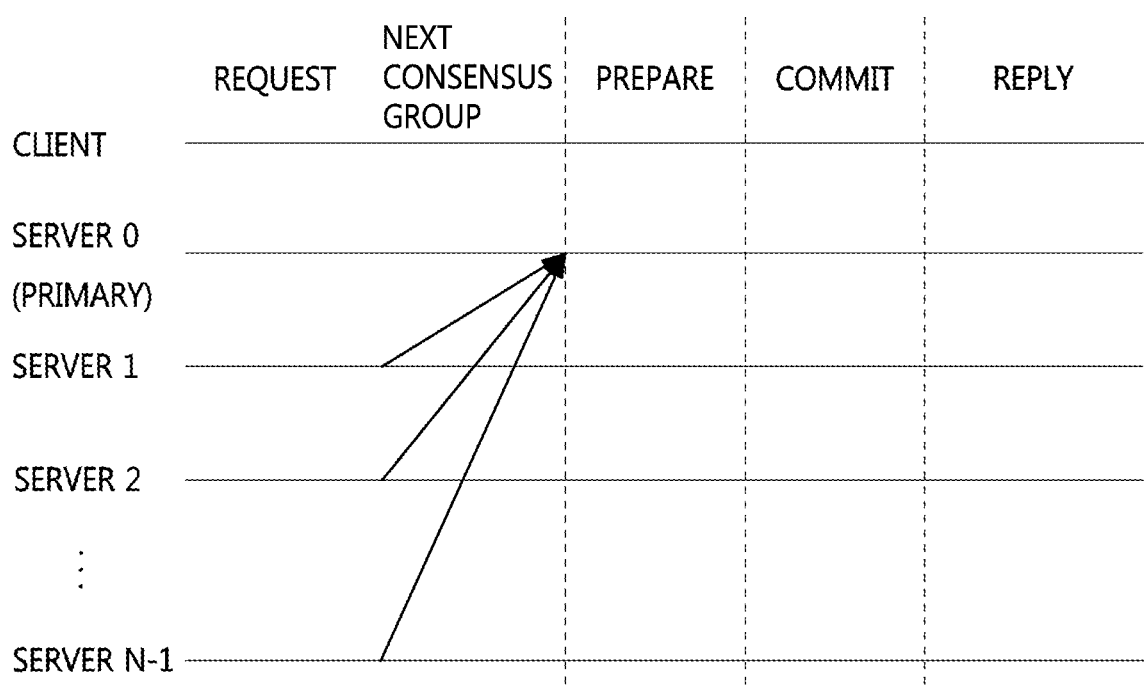
FIG. 6 is a diagram illustrating a first procedure for distributed consensus processing according to an embodiment of the present invention.
Figure 7:
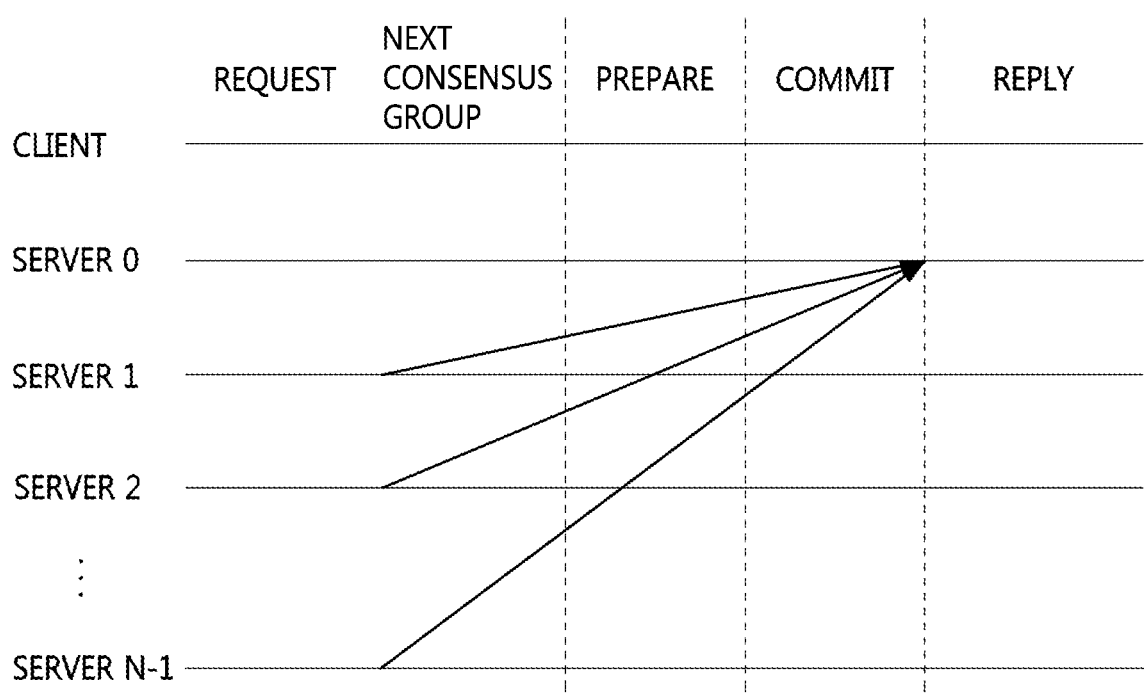
FIG. 7 is a diagram illustrating a second procedure for distributed consensus processing according to an embodiment of the present invention.

FIG. 3 is a diagram illustrating a hash chain and a nonce chain according to an embodiment of the present invention. FIG. 4 is a diagram illustrating the heights of blocks according to an embodiment of the present invention. FIG. 5 is a diagram illustrating a distributed consensus protocol according to an embodiment of the present invention. FIG. 6 is a diagram illustrating a first procedure for distributed consensus processing according to an embodiment of the present invention. FIG. 7 is a diagram illustrating a second procedure for distributed consensus processing according to an embodiment of the present invention. FIG. 8 is a diagram illustrating a multi-signature according to an embodiment of the present invention. FIG. 9 is a diagram illustrating partial multi-signature verification according to an embodiment of the present invention.

A subject that achieves distributed consensus in the apparatus and method for achieving distributed consensus based on decentralized Byzantine fault tolerance according to the embodiment of the present invention may be selected.

Referring to FIG. 3, it can be seen that a hash chain generation procedure and a procedure for extending and utilizing a nonce chain are illustrated.

A specific node included in the blockchain according to an embodiment of the present invention may reveal start_height 301 and nonce(1) 302 so as to use the nonce chain. N may be an index value for calculating a nonce index to be used in the nonce chain, and may be obtained by subtracting the start_height value from a current block height value, as presented by the following Equation (4). By means of Equation (4), N may be calculated, and two nonce values in blocks 303 and 304 may be consecutively used, and thus security and computing speed may be improved.

$$N = \text{current block height}(h) - \text{start\_height} \quad (4)$$

Referring to FIG. 4, examples of block heights are illustrated in detail. Assuming that a block on which consensus is desired to be currently achieved is 402 and a block height (HEIGHT) is h, block 401 may be a block in which consensus is achieved on height h−1, and block 403 may be a block in which consensus is achieved on height h+1.

The present invention may simultaneously perform a procedure for achieving consensus on the current block and a procedure for registration of congress for the next block. For example, when congress for block 403 is registered while congress for block 402 is reaching consensus on the block, nodes that have acquired qualification to be included in the congress for block 403 may request SERVER 0 of block 402 to register them as congress members for block 403 during a consensus period for block 402.

In this case, as shown in Equation (5), $pk_i$, $Q_i$ and messages required for consensus on block 402) may be transferred together. Here, subscript i in $pk_i$ and $Q_i$ may mean data generated by one of congress members (i.e., SERVER 0 to SERVER 3).

When reply messages are sent for block 401, congress candidate nodes may calculate N using Equation (2), and may thereafter perform an operation of comparing an arbitrary value, which is generated by hashing the nonce(2N) value 303 and a head hash value for block 401, with a threshold value for block congress selection so as to determine whether they have been selected as the congress members for block 403.

Here, when the result of the comparison is true, congress candidate nodes may generate concatenated data (of msg and message digest), which includes a nonce (2N) value and $pk_i$ and $Q_i$ required for a procedure for reaching consensus on block 403, as shown in the following Equation (5), and may transfer the concatenated data to the SERVER 0 of congress for block 402, so as to prove that the nodes themselves are legally selected nodes, to other nodes.

msg||message digest message digest=Hash(msg||nonce 2$N$+1))

msg=Nonce(2$N$)||$pk_i$||$Q_i$     (5)

In Equation (5), || stands for a concatenation operation, which means the operation of connecting two factors and generating one piece of data, and Hash( ) stands for a hash function, which means the operation of generating an arbitrary value by hashing factors.

SERVER 0 for block 402 may check the legitimacy of nonce (2N) values of respective nodes by performing a comparison with the above-described threshold value on a received message. All nodes that passed the legitimacy check by SERVER 0 may be congress members for block 403.

In order to divide the roles of servers SERVER 0 to SERVER 3 in the selected congress members for block 403, a part of nonce (2N) data transmitted by each node may be truncated to generate a coupon (e.g., of LSB 32 bits).

Here, a node having the minimum coupon value may be SERVER 0. When the number of nodes having the minimum coupon value is 2 or more, a node having the minimum value for nonce (1) 302 may be selected as SERVER 0. Here, as a target to be compared, nonce(2N−1) or the like may be used instead of the value of nonce (1). Also, when a problem occurs in SERVER 0 and it is impossible to achieve consensus during an attempt to reach consensus, the node having the smallest coupon, with the exception of SERVER 0, may play the role of the new SERVER 0.

During a procedure for selecting congress for block 403 in FIG. 4, the method for transferring a message (msg) and a message digest may be performed through the process of FIG. 6 or 7 or a separate process.

Referring to FIG. 4, each of congress members for block 402 may transfer information, which includes request content verified in the DELEGATE REQUEST phase for consensus on block 402, its own nonce (2N+1) value 304, and an electronic signature value for such a message, to SERVER 0.

For example, a value, which is obtained by hashing, 2N−1 times, msg for block 402 and a nonce (2N) value 303 included in the message digest, must be identical to the nonce (1) value 302, and each server may transfer a REQUEST message and the nonce(2N+1) value 304 to SERVER 0 in the DELEGATE REQUEST phase for block 403. The reason for this is that, during the block consensus time for block 403, a value, which is obtained by hashing once the nonce(2N+1) values 304 of SERVER 1 to SERVER 3 received by SERVER 0, must be equal to the nonce (2N) values 303 of respective SERVER 1 to SERVER 3 stored in block 402.

Referring to FIG. 6, it can be seen that, when consensus on block 402 is currently being achieved, congress information for block 403 is transferred together with a DELEGATE REQUEST message through a multi-signature, and thus the congress for block 403 is fixed.

Referring to FIG. 7, it can be seen that the congress is fixed by adding congress information for block 403 to committed blocks. In addition, a method of selecting and managing congress members separately from blocks may also be used.

Referring to FIG. 5, it can be seen that consensus on each block is achieved via a DELEGATE REQUEST phase, a PREPARE phase, a COMMIT phase, and a REPLY phase. On the left side of FIG. 5, roles of respective nodes are indicated. In FIG. 5, SERVERS 0 to 3 are congress members for a block on which consensus is currently being achieved, and SERVER 0 is configured using one server, but each of SERVERS 1 to 3 may be configured using f servers, where f>=1. The congress members may be changed for each block.

Assuming that, when a reply phase for block 401 illustrated in FIG. 3 is performed, information about congress members for block 402, which have been selected, is included in a reply message and transferred to nodes, the current phase is the phase in which consensus on block 402 is currently being achieved. In this case, the apparatus and method for achieving distributed consensus based on decentralized Byzantine fault tolerance according to the embodiment of the present invention may select any one of SCHEMES 1 to 3 and then use a congress and a consensus quorum depending on the system design.

SCHEME 1 may fix the number of congress members at 3f+1 and fix a consensus quorum at 2f+1.

In SCHEME 1, when the number of nodes that request registration as congress members is equal to or greater than 3f+1, 3f+1 nodes, among the nodes, may be randomly selected to replace the congress members, and consensus may be achieved based on a consensus quorum of 2f+1, among the congress members. Since the probability that 3f or fewer nodes will be selected through Equation (3) becomes $P_{min\_node}$ or less, congress members may be stochastically replaced with a probability of 1−$P_{min\_node}$. However, the congress members may be replaced with a probability lower than 1−$P_{min\_node}$ due to a network failure or node malfunctioning. SCHEME1 is advantageous in that the number of congress members is always 3f+1, and thus there are a sufficient number of reserved nodes which will constitute a consensus quorum of 2f+1. Accordingly, even if attempt to reach consensus has failed, the reserved nodes may be added, thus enabling a consensus quorum to be easily constituted again. SCHEME1 is disadvantageous in that, since the probability of success in the replacement of congress members is $1-P_{min\_node}$ or less, there may occur the situation in which the congress members will not be replaced in spite of the low probability.

As described above, in SCHEME1, the consensus quorum may be 2f+1 (where f is an integer of 1 or more), and f may satisfy both a first condition and a second condition. Here, the first condition may be a condition satisfied in the case where, when the congress candidate nodes are selected from among all nodes of the blockchain at a probability of p (where p is a real number that is equal to or greater than 0 and is less than or equal to 1), a first probability that the number of Byzantine nodes to be selected as the congress candidate nodes will be greater than f is less than or equal to a preset first reference probability. The second condition may be a condition satisfied in the case where a second probability that the number of congress candidate nodes will be less than or equal to 3f is less than or equal to a preset second reference probability.

For example, it may be assumed that n is the total number of nodes, $b_p$ is the ratio of Byzantine nodes to all nodes, b is the number of Byzantine nodes, and p is the probability that a coin will come up heads in the case where a node, for which the coin comes up heads when coin flipping is conducted, is selected.

Here, when n is 1000 and $b_p$ is 0.2 (i.e. when 20% of all nodes are Byzantine nodes), b may be 200 (b=n*$b_p$=1,000*0.2=200).

For example, it is assumed that, when all of n participating nodes flip a coin that is biased so as to have a probability of coming up heads of 0.1 once, nodes for which the coin comes up heads are selected as congress candidates.

Here, an average of 100 nodes may be selected with a binomial probability distribution.

Here, since the number of nodes is sufficiently large (30 or more), the probability that the corresponding node will be selected may approach a normal distribution by means of a "central limit theorem", and may more precisely approach a binomial distribution.

When coin-flipping operations conducted by respective nodes are independent of each other (i.e., when the coin flipped by each node is not influenced by the results of coin flipping conducted by a previous node, the operations are independent of each other), some of the nodes may be classified into groups, and only the distribution of the probabilities that the groups will be selected may be separately calculated.

Therefore, when only Byzantine nodes (b) of all nodes (n) flip a coin having a probability p of coming up heads, the cumulative probability of the number k of Byzantine nodes for which the coin comes up heads being less than or equal to f may be calculated using Equation (1) (cumulative probability for binomial distribution).

Equation (2) may satisfy the condition in which the probability that the number k of Byzantine nodes selected from among Byzantine nodes through coin flipping will be greater than f is less than or equal to $P_{max\_bzt}$.

Here, 1.1 e-16=$P_{max\_bzt}$ may be satisfied. This value is not a fixed value, but another value (e.g., 5*10−9) may be used depending on the system design.

Further, the condition in which the cumulative probability that the number x of nodes for which, when all of participating nodes flip a coin having the same probability p, the coin comes up heads will be less than or equal to 3f, is less than or equal to $P_{min\_node}$ may be represented by Equation (3):

When the total number of participating nodes n is given, p satisfying both Equations (2) and (3) while increasing the node selection probability may be calculated. When nodes conduct coin flipping at the calculated probability of p, and 3f+1 nodes, among the nodes for which the coin come up heads, are randomly set as congress members, the probability that the number of Byzantine nodes included in the congress members will be greater than f may be maintained at $P_{max\_bzt}$ or lower.

For example, it may be considered that the total number of nodes n=1,000, Byzantine proportion bp=0.2, the number of Byzantine nodes b=n*bp=1,000*0.2=200, $P_{max\_bzt}$=1.1e-16, and $P_{min\_node}$=1.0e-6. In this case, when the node selection probability p is increased from 0 and p satisfying both Equations (2) and (3) is calculated, it is assumed that Equations (2) and (3) are satisfied at p=0.1. At this time, when each node conducts coin flipping to check whether the node itself has been selected, if the coin-flipping operations by the nodes are independent of each other, the average number of nodes selected from among 200 Byzantine nodes may be 20 (since the node selection probability p is 0.1).

In Equation (2), since the probability that the number of nodes for which the coin comes up heads, among 200 Byzantine nodes, will be greater than 30 is very low, the probability is less than or equal to $P_{max\_bzt}$.

Here, when a total of 1,000 nodes conduct coin flipping, the average number of nodes for which the coin comes up heads may be 100.

Here, when the probability that the coin will come up heads for 90 or fewer nodes can be calculated as a value less than $P_{min\_node}$, in the case where all nodes conduct coin flipping, and 91 nodes are randomly selected from among the nodes for which the coin comes up heads and are then set as congress members, the probability that the number of Byzantine nodes included in the 91 nodes will be greater than 30 may still be less than or equal to $P_{max\_bzt}$.

The reason for this is that the probability that, when 200 Byzantine nodes conduct coin flipping at a node selection probability of 0.1, 30 or more Byzantine nodes will be selected is less than or equal to $P_{max\_bzt}$.

That is, all nodes in the blockchain according to the embodiment of the present invention may calculate the total number of cases where the proportion of the number of Byzantine nodes included in an arbitrary number of nodes obtained through coin flipping exceeds 33%, and may sum up the results of calculation.

Here, all of the nodes may select the congress members while maintaining the number of Byzantine nodes to a desired number using a method of calculating a number at which the maximum number of Byzantine nodes to be selected does not exceed a preset probability value, setting the calculated number as f, indicative of the number of nodes, and randomly selecting 3f+1 nodes in an environment in which a total of 3f+1 or more nodes can be selected.

SCHEME 2 may configure the congress so that the number of congress members is 2f+1 or more, and may fix a consensus quorum at 2f+1.

SCHEME 2 may fix a consensus quorum at 2f+1, and when the number of nodes that declare themselves as congress members is equal to or greater than 2f+1+β (0≤β≤f), may set the number of congress members to a value that is equal to or greater than 2f+1+β and less than or equal to 3f+1, and may then replace all congress members. In SCHEME 2, when a consensus quorum of 2f+1 is constituted in PREPARE and COMMIT phases, consensus may be reached even if β nodes do not reply due to a network or node failure. That is, SCHEME 2 always enables consensus to be reached by a consensus quorum of 2f+1 when β nodes are added to f nodes that do not reply at 3f+1.

Assuming that a network or node failure does not occur, the probability that the number of congress members will be less than 2f+1+β may be less than or equal to 1.0e-6. This means that the congress may not be changed once while congress members are replaced a million times. However, in consideration of the number of congress members f that do not reply due to a network or node failure, it is preferable to configure congress members so that β is sufficiently high. This scheme is disadvantageous in that, if the attempt to reach consensus fails when β is low, the possibility of constituting a quorum for achieving consensus again is weak.

SCHEME 3 may configure the congress so that the number of congress members c satisfies $2f+1 \leq c \leq 3f+1-\alpha$ and a consensus quorum is fixed at 2f+1.

In SCHEME 3, when the maximum number of Byzantine nodes that may be included in randomly selected nodes is greater than f, the number of congress members and a consensus quorum, which are required when consensus is achieved by obtaining consent from f+α+1 nodes in the PREPARE phase, may be selected.

SCHEME 3 may assume that the remainder, obtained by subtracting f from the maximum number of Byzantine nodes that may stochastically occur, is a, and that consent is obtained from f+α+1 nodes satisfying the following Equation (6) instead of f+1 in the PREPARE phase. Here, assuming that the number of nodes corresponding to congress members is c, a fork may not occur when c satisfies the condition of the following Equation (7):

$$f+\alpha+1 > \text{MaxBzt}:(0 \leq \alpha \leq f) \quad (6)$$

$$2f+1 \leq c \leq 3f+1-\alpha:(0 \leq \alpha \leq f) \quad (7)$$

For example, when f=1 and α=1, MaxBzt=2, and f+α+1=3 may be obtained based on Equation (6).

Also, the number of congress candidate nodes may be 3≤c≤3 based on Equation (7). Therefore, when the number of congress members is 3 and a consensus quorum is 3, SERVER 0, SERVER 1, and SERVER2 may constitute only one consensus quorum, and then a fork does not occur. However, this example may be identical to Byzantine fault tolerance (BFT) consensus.

As another example, when f=3, α=1, and groups of SERVER 0 and SERVER1 are Byzantine nodes, MaxBzt=f+α=4 is obtained, and f+α+1=5 is satisfied based on Equation (6), and thus at least one normal node may be included in the PREPARE phase. The range of the number of congress candidate nodes may be 7≤c≤9 based on Equation (7). Since the consensus quorum (2f+1) for COMMIT is 7, the consensus quorum may be satisfied only when at least three normal nodes are included in addition to four Byzantine nodes. Therefore, unless one or more normal nodes are repeatedly included, two COMMIT nodes cannot be configured, and thus finality may be guaranteed.

Therefore, when the maximum number of Byzantine nodes that may be stochastically selected is less than 2f, SCHEME3 to which Equations (6) and (7) are applied may be used.

Congress update may be performed such that, when the number of nodes requested as congress members for the next block is less than 2f+1, update may not be performed, and congress members for the current block may again become congress members for the next block, or empty agreement may be performed by a number of nodes fewer than 2f+1. The congress update may be performed such that, when the number of nodes requested as congress members for the next block is equal to or greater than 2f+1 and less than or equal to 3f+1-α the congress may be updated without change, and such that, when the number of nodes requested as congress members for the next block is greater than 3f+1-α, SERVER 0 may randomly select 3f+1-α nodes and then update the congress.

SERVER 0 may reach consensus by reflecting the opinion of the node itself in a procedure for achieving consensus on block 402. In the present invention, for multi-signature of servers, EC-Schnorr multi-signature of FIG. 8 may be used.

Distributed consensus based on decentralized Byzantine fault tolerance according to an embodiment of the present invention may include REQUEST, DELEGATE REQUEST, PREPARE, COMMIT, and REPLY phases, as illustrated in FIG. 5, and respective phases will be described in detail below.

In the REQUEST phase, congress members are not fixed, but are configured again for each block, and thus a client may broadcast a REQUEST (i.e., REQUEST message) to all candidate nodes (or servers). Since congress members are randomly selected, other candidate nodes that are not selected as congress members may continuously receive the REQUEST. Here, due to error, delay or malicious intent, not all nodes can receive the REQUEST. Generally, in a practical Byzantine Fault Tolerance (PBFT) algorithm, the situation in which, among 3f+1 nodes, f nodes cannot receive the REQUEST is assumed, and thus SERVER 3 of FIG. 5 is in a passive state to ignore all operations.

In the DELEGATE REQUEST phase, the operations of transmitting-side servers SERVER 0 to 3 and the operation of SERVER0 are described separately. First, the operations of the transmitting-side servers will be described below.

Congress candidate nodes according to an embodiment of the present invention may check whether abnormalities are present in first transactions of REQUESTS respectively including the first transactions which request distributed consensus proposed by a client. When a REQUEST block is received from SERVER 0 for block 401, congress members for block 402 may start sending DELEGATE REQUEST.

The congress members may insert proposed transactions, which are first transactions found not to have abnormalities in the above-described check, into DELEGATE REQUEST, and may send the resulting DELEGATE REQUEST to SERVER 0. DELEGATE REQUEST from each server may include a proposed transaction, nonce(2(N+1)), $Q_i$(h+1), and $pk_i$(h+1). Here, the proposed transaction may correspond to transactions (first transactions) determined to be normal by each server. The nonce(2(N+1)), $Q_i$(h+1), and $pk_i$(h+1) may be information used to enable congress members for block 402 to be used again as the congress members for block 403 when the congress members for block 403 are not changed. Further, an electronic signature of the corresponding transmitting-side server may be added to all content including the corresponding message. The added electronic signature may be checked only when a problem occurs in the multi-signature of the servers, rather than being immediately verified by SERVER 0, and may then be used to check faults in the servers.

Here, when 2f+1 servers including SERVER 0 itself receive DELEGATE REQUEST and the reception of DELEGATE REQUEST from a number of servers forming a consensus quorum of 2f+1 including SERVER 0 itself is completed, SERVER 0 may determine the servers to be consensus nodes forming the consensus quorum, and may perform a subsequent operation. Here, SERVER 0 may also continue to receive DELEGATE REQUEST from the remaining servers.

SERVER 0 may select a set of transactions sent from f+α+1 or f+1 nodes from among proposed transactions which are normal first transactions of the received 2f+1 DELEGATE REQUESTS, and may determine a prepared transaction, which is a second transaction, based on the first transactions. Here, in order to allow consensus nodes to check the results of determination of the consensus nodes in the prepared transaction, SERVER 0 may generate a bitmap, which is first bitmap information, such as that shown in Table 1, and may present the bitmap to all consensus nodes, thus preventing SERVER 0 from falsely creating the prepared transaction based on the first transactions.

TABLE 1

| | Server bit map | | |
|---|---|---|---|
| | 0 | 1 | 2 |
| transaction0 | 1 | 0 | 1 |
| transaction1 | 1 | 1 | 1 |
| transaction2 | 0 | 1 | 1 |
| transaction3 | 0 | * | 0 |
| transaction4 | 1 | 1 | 0 |
| transaction5 | 1 | 0 | 1 |
| transaction6 | 0 | 1 | 1 |
| transaction7 | 0 | * | 0 |
| transaction8 | 0 | 0 | * |
| transaction9 | 1 | 1 | 1 |

It can be seen that Table 1 shows examples of the proposed transaction bitmap (More than f+1 servers make DELEGATE REQUESTS), which is first bitmap information corresponding to the second transaction.

SERVER 0 may provide a PREPARE message including a second transaction and the first bitmap information (prepared transaction and proposed transaction bitmap). Each of the prepared transaction and proposed transaction bitmap provided by SERVER 0 may be a set of transactions that have respectively passed a validity check in at least f+α+1 nodes, and the set of transactions may be in the state in which an attacker cannot change the content of the transactions during a data transfer procedure by means of the proposed transaction bitmap, which is the first bitmap information, and the electronic signature of SERVER 0.

For example, SERVER 0 may assume the situation in which 10 transactions initiated by a client are distributed to four servers, as shown in the following Table 2.

Table 2 shows valid transaction requests of the client, which are received by respective servers.

TABLE 2

| | Number of transaction |
|---|---|
| Server0 | 0, 1, 4, 5, 9 |
| Server1 | 1, 2, 3, 4, 6, 7, 9 |
| Server2 | 0, 1, 2, 5, 6, 8, 9 |
| Server3 | 0, 2, 3, 5, 7 |

Here, assuming that SERVER 3 is in a passive state and thus performs no operations, SERVER 0 may determine that the numbers of transactions, on which DELEGATE REQUESTS are simultaneously made by f+α+1 or more servers (in this example, α=0 is assumed), among the transactions proposed by SERVERS 0, 1, and 2, are "0, 1, 2, 4, 5, 6, 9", as shown in the following Table 3.

TABLE 3

| | Number of transaction |
|---|---|
| Prepared transaction | 0, 1, 2, 4, 5, 6, 9 |

It can be seen that Table 3 shows an example of the prepared transaction which is the second transaction.

When Table 3 is represented by a bitmap which contains first bitmap information, Table 1 is obtained. In Table 1, '1' indicates that the server has made a DELEGATE REQUEST for the corresponding transaction. '0' may indicate a transaction not proposed by the server, wherein each row may indicate one transaction. The number of columns in Table 1 may be 2f+1. Each transaction for which the sum of bits corresponding to '1' in each row is equal to or greater than f+α+1 means that, among the servers, f+α+1 or more servers simultaneously make a DELEGATE REQUEST for the corresponding transaction, and each transaction for which the sum of bits corresponding to '1' is less than f+α+1 means that the corresponding transactions could not be committed. The server which has made DELEGATE REQUEST may be counted as a valid DELEGATE REQUEST server only when it proposes at least one transaction. For the mark * in Table 1, a method may be utilized such that, when '1' is indicated only for a transaction for which f+α+1 consents are obtained, the mark * may be indicated by '0', and such that, when the server that has made DELEGATE REQUEST is confined to include at least one transaction, the mark * is indicated by '1'.

In the PREPARE phase, for the second transaction, which is the result of obtaining consents from f+α+1 or more nodes in the DELEGATE REQUEST phase, a message (PREPARE block) for obtaining consent to the result of determining consensus nodes forming a consensus quorum may be transferred to respective consensus nodes (e.g., SERVERS 0 to 2). In block 401 for which consensus has been reached, $pk_i$ values and $Q_i$ values of nodes which were selected as congress members for block 402 are recorded. Therefore, SERVER 0 may generate an aggregated public key pk by aggregating public keys $pk_i$ meeting a selected consensus quorum, as represented by the following Equation (8), and may generate Q by aggregating $Q_i$ values, as represented by the following Equation (9).

$$pk = \sum_{nod\ e_i \in quorium} pk_i \qquad (8)$$

$$Q = \sum_{nod\ e_i \in quorium} Q_i \qquad (9)$$

$$r = \text{Hash}(pk\|Q\|msg) \bmod p \qquad (10)$$

In Equations (8) and (9), a quorum denotes nodes included in a consensus quorum of 2f+1. Finally, SERVER 0 generates r, as shown in Equation (10), wherein Msg may be a head value of a complete block including the prepared transaction, which is the second transaction generated in the previous procedure. A PREPARE block must be a complete block including a transaction, as in a normal blockchain.

Here, SERVER 0 may prevent even one bit in the provided PREPARE block from being subsequently changed or added through a multi-signature in which all nodes forming a consensus quorum write signatures for the PREPARE block.

Also, SERVER 0 may create a delegate server bitmap, which is second bitmap information, and transfer it together with other information so as to distinguish the 2f+1 nodes from each other (When DELEGATE REQUEST is confined to necessarily include one or more transactions, second bitmap information (a Delegate server bitmap) may be calculated from the first bitmap information (a Proposed Transaction bitmap)).

Therefore, SERVER 0 may generate a PREPARE block by adding its own electronic signature to a PREPARE message including the second transaction, the first bitmap information, the second bitmap information, a public key, and a hash value r (i.e., prepared transaction, proposed transaction bitmap, delegate server bitmap, Pk, and r), and may deliver the PREPARE block to SERVERS 0, 1, and 2, which will produce a multi-signature.

In the COMMIT phase, respective nodes included in a consensus quorum may generate COMMIT messages, each containing an electronic signature, as the expression of consent to the PREPARE message from SERVER 0, and SERVER 0, having received the COMMIT messages, may aggregating the electronic signatures of respective consensus nodes into the multi-signature, and may verify the multi-signature.

SERVER 0 may perform a procedure for aggregating the electronic signatures into a multi-signature. SERVER 0 may receive, as a multi-signature, consents (commit messages) from all of 2f+1 servers included in a consensus quorum.

In order to check whether the PREPARE block generated by SERVER 0 has an abnormality, each of SERVERS 0, 1, and 2, having received the PREPARE block, may perform the following operations when the result of checking the validity of the electronic signature generated by SERVER 0 is true, and may take actions such as notifying other nodes of the false result and performing empty agreement when the result of checking the validity is false.

Further, in order to verify the validity of r generated by SERVER 0, each of SERVER 0, 1, and 2 may check whether the second bitmap information (delegate server bitmap) contains 2f+1 or more '1's or whether at least one '1' is indicated in each column of the first bitmap information (Proposed Transaction bitmap), and the number of these columns is 2f+1.

Here, when the result of verifying the validity is true, each of SERVERS 0, 1, and 2 may extract $pk_i$ and $Q_i$ of a server corresponding to each bit from the information recorded in block 401.

Each of SERVERS 0, 1, and 2 may generate pk and Q based on Equations (6) and (7), and may generate r' based on Equation (10).

Each of SERVERS 0, 1, and 2 may compare the generated r' with r transferred from SERVER 0, and may perform a subsequent operation when the values of r' and r are identical to each other.

When the values of r' and r are different from each other, it may be determined that SERVER 0 deceives Pk, Q, or Msg, and thus each of SERVERS 0, 1, and 2 may take actions such as notifying other nodes of this result and performing empty agreement.

Here, each of SERVERS 0, 1, and 2 may check whether each transaction contains only transactions to which f+α+1 consents are obtained based on the second transaction (Prepared transaction bitmap) and the first bitmap information (Proposed Transaction bitmap), which are contained in the PREPARE block sent by SERVER 0.

For example, assuming that Table 3 shows information about the second transaction Prepared transaction sent by each server and Table 1 shows the Proposed Transaction bitmap for the server that proposed the transaction, it may be determined that, when a row matching the transaction included in Table 3 is present in Table 1 and the total number of 1s present in the corresponding row is equal to or greater than f+α+1 (e.g., 2 in the present example), the validity check may succeed, and when at least one row in which the total number of 1s is less than f+α+1 is present, the validity check may fail. For example, when one of transactions 3, 7, and 8 is included in the Prepared transaction of Table 3, the corresponding transaction is not proposed by f+α+1 servers, and thus the validity check may fail.

When the validity check succeeds, each of SERVERS 0, 1, and 2 may check whether '1' is indicated only for transactions proposed by the server itself in a column corresponding to each server so as to check whether '1' is indicated in a bitmap corresponding to a portion other than the transaction proposed by the server itself.

Here, each of SERVERS 0, 1, and 2 may fail in the validity check when '1' is indicated for a transaction that is not proposed by the server itself. For example, in the case where transaction 3 is indicated in Table 3 and a bit corresponding to SERVER 0 or SERVER 2 in a fourth row in Table 1 is indicated by '1', SERVER 0 deceives other servers, and thus the validity check by SERVER 0 or SERVER 2 may fail. Also, when a multi-signature for the normal Proposed Transaction bitmap is not received from SERVER 1 or SERVER 2 within a preset period of time, the validity check may fail. When at least one of validity check results indicates failure, empty agreement may be initiated, whereas when the validity check results indicate success, the next phase may be performed.

Here, when all of the validity check results are true, each of SERVERS 0, 1, and 2 may generate $s_i$ by applying r, received from SERVER 0, and $k_i$ and $sk_i$, privately owned by the corresponding server, to $s_i = k_i - r*sk_i$ in FIG. 8, and may transfer a resulting message to SERVER 0 by adding the electronic signature of the corresponding server to a message including $s_i$.

SERVER 0, having received $s_i$, may first verify an aggregated multi-signature, as illustrated in FIG. 8, without immediately checking the electronic signatures of respective servers. When the result of verification is false, a procedure for finding a fake signature and checking the electronic signature of the corresponding server may be performed in order to determine whether the corresponding signature has been damaged by a man-in-the middle attacker.

When the result of verifying the signature (r, S) generated by SERVER 0 is false and SERVER 0 did not generate a fake signature, SERVER 0 may locate the one among SERVERS 1 and 2 that transferred the fake $s_i$.

When SERVER 0 has completed the reception of $s_i$, from all of 2f+1 servers, SERVER 0 may generate 5, perform verification of FIG. 8 on the generated S, and broadcast a message including Prepared transaction, Pk, and (r, 5) to all nodes in a REPLY phase when the result of verification is true, thus completing the achievement of consensus.

Also, errors or faults occurring in the consensus procedure may be processed as follows. In DELEGATE REQUEST, PREPARE, and COMMIT phases, a timer may be set at each start point, and fault processing may be performed unless the next phase is initiated before the timer is terminated. An operation by which the nodes according to the embodiment of the present invention achieve consensus on a block having no transaction may be referred to as "empty agreement". Empty agreement may have the effect of changing congress members even if valid transactions are not included in the corresponding block.

In the nodes according to the embodiment of the present invention, consensus nodes are fixed, and thus a view change may be performed so as to respond to failure to reach consensus when the attempt to reach consensus fails. However, in the nodes according to an embodiment of the present invention, consensus nodes are not fixed, and thus consensus nodes may be reconfigured, rather than performing a view change when the attempt to reach consensus fails.

In the nodes according to an embodiment of the present invention, it is more preferable to generate blocks having no transactions so as to reduce the complexity of protocols while reducing risk, rather than causing unreliable nodes to attempt to reach consensus again when the attempt to reach consensus fails.

Empty agreement may be performed by obtaining at least $f+\alpha+1$ consents. Empty agreement may prevent multiple empty agreement blocks from being generated in respective networks when the network is split. For this, consensus nodes included in the consensus quorum may be designated not to be changed during a consensus time for one block.

Fault processing in a DELEGATE REQUEST phase may be performed such that, when SERVER 0 in block 402 receives a reply to the result of consensus on the block 401, a DELEGATE REQUEST timer may be initiated, and consensus on block 402 may start. When normal DELEGATE REQUEST messages meeting a consensus quorum of 2f+1 are not received before the DELEGATE REQUEST timer of SERVER 0 expires, empty agreement may be performed by $f+\alpha+1$ or more consensus nodes while an error message indicating that fewer than 2f+1 requests have been received is sent. Also, after receiving a reply to the result of consensus on block 401, each of SERVERS 0 to 3 may initiate its own DELEGATE REQUEST timer while transferring its own DELEGATE REQUEST packet. When SERVER 0 does not perform a PREPARE phase until the DELEGATE REQUEST timer of each server expires, the server having the smallest coupon, among coupons other than the coupon of SERVER 0, may be declared the new SERVER 0, and empty agreement may be attempted. In this case, a log of this error may be included in the corresponding block.

False processing in the PREPARE phase may be performed such that SERVER 0 initiates a PREPARE timer while transferring a first PREPARE packet. When si is not received from all servers forming a consensus quorum of 2f+1 before the PREPARE timer is terminated, SERVER 0 may add a server which did not send si to a blacklist, and may conduct empty agreement through $f+\alpha+1$ or more consensus nodes other than the node of the server in the blacklist from the consensus quorum.

Fault processing in COMMIT phase may be performed such that, when a signature aggregated by SERVER 0 is not verified, SERVER 0 may find a problematic server among servers that sent si, may add the problematic server to the blacklist, and may conduct empty agreement through $f+\alpha+1$ or more consensus nodes other than the node of the server in the blacklist from the consensus quorum. Further, when each of the servers forming a consensus quorum receives a PREPARE packet from SERVER 0, the corresponding server may initiate a COMMIT timer. When SERVER 0 does not start sending a REPLY message before the COMMIT timer expires, SERVER 0 may be replaced with a new SERVER 0, and empty agreement may be conducted through $f+\alpha+1$ or more consensus nodes, other than the existing SERVER 0.

In the above description, a method of achieving consensus through a view change rather than empty agreement when the attempt to reach consensus fails may also be included in fault-processing methods.

Figure 10:
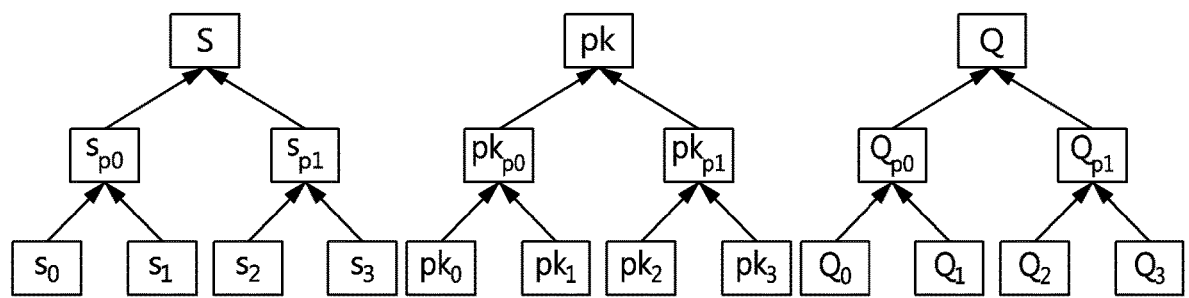
FIG. 10 is a diagram illustrating a multi-signature tree according to an embodiment of the present invention.

FIG. 10 is a block diagram illustrating a multi-signature tree according to an embodiment of the present invention.

Referring to FIG. 10, it can be seen that a multi-signature generation procedure performed in a COMMIT phase according to an embodiment of the present invention is illustrated. In order to find a false piece si of a multi-signature, SERVER 0 may randomly combine two or more signatures, as illustrated in FIG. 10, based on the characteristics of an Elliptic-Curve/Schnorr (EC-Schnorr) multi-signature, and may check whether an abnormality is present in the combined signature.

$$S = \sum_{i=1}^{n} s_i \qquad (11)$$

Therefore, when $$S = \sum_{i=1}^{n} s_i$$

in Equation (11) is performed, trees may be configured by repeating a procedure for adding two arbitrary values to each other and subsequently pairing and adding two resulting values, obtained from respective additions, to each other, as illustrated in FIG. 10, rather than unconditionally adding all si. Here, vertices of respective trees may correspond to S, Q, and pk of FIG. 8. Here, S may be a part of the resulting values of the Schnorr multi-signature, Q may be a value obtained by summing up $Q_i$ pieces, and pk may be a public key of the aggregated multi-signature.

For example, when the verification of the final signature S fails in the procedure for verifying the multi-signature, $S_{p0}$ and $S_{p1}$, one level lower than the top-level node of the tree, are checked. When the result of checking $S_{p0}$ fails, it may be determined that a partial signature corresponding to one of $S_0$ and $S_1$ is faulty, and thus only the electronic signature of the corresponding server may be checked, and the time required for checking may be reduced.

When one server sends a false partial signature, which is a fake electronic signature, and the partial signatures are aggregated and verified in a tree structure, the server that sent the fake signature may be found by means of a partial signature check based on the tree and one electronic signature check.

Figure 11:
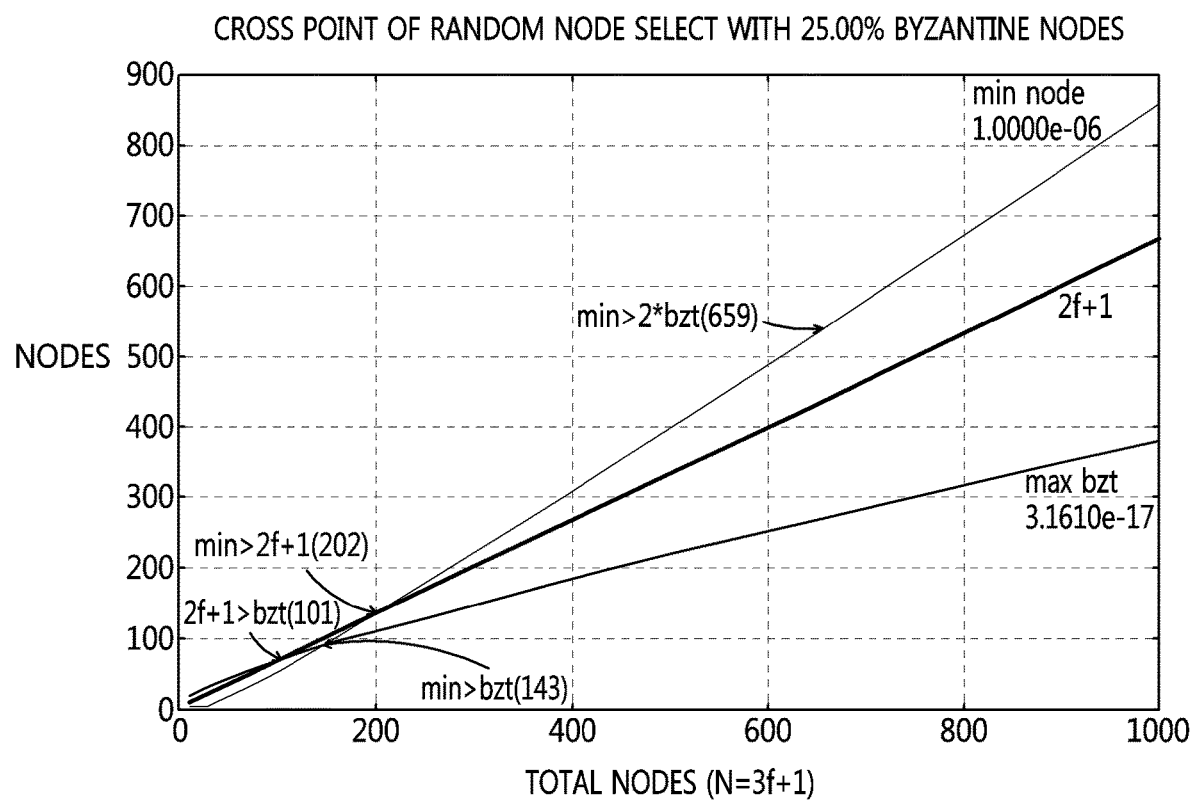
FIG. 11 is a graph illustrating a Byzantine node distribution according to an embodiment of the present invention.
Figure 12:
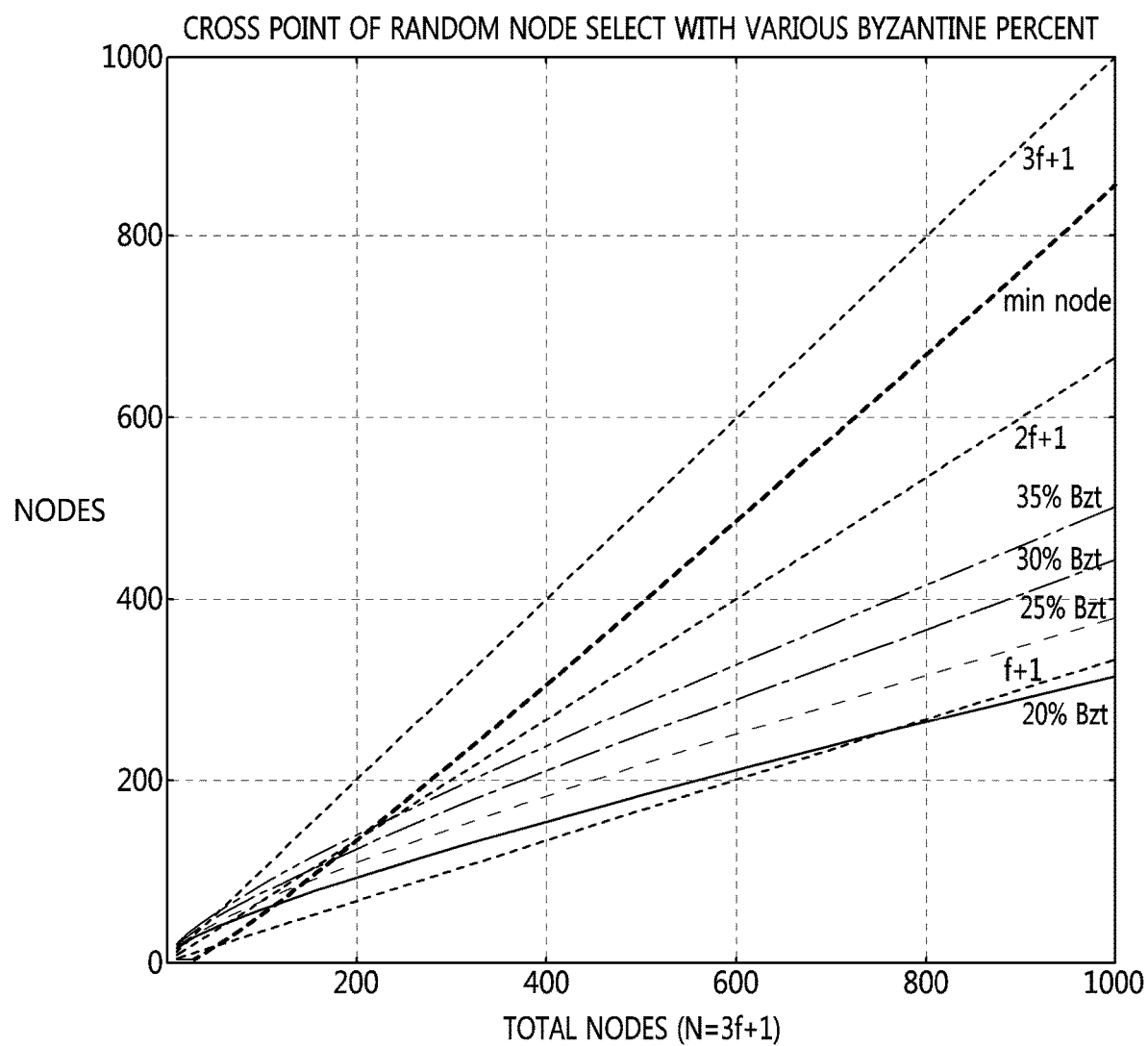
FIG. 12 is a graph illustrating Byzantine node distributions in various environments according to an embodiment of the present invention.

FIG. 11 is a graph illustrating a Byzantine node distribution according to an embodiment of the present invention. FIG. 12 is a graph illustrating Byzantine node distributions in various environments according to an embodiment of the present invention.

Referring to FIG. 11, assuming that there are a sufficient number of mother trees of nodes and that arbitrary nodes are selected based on a comparison with a threshold value, the number of selected nodes may have a normal distribution. When the average µ of this distribution is 3f+1, the stochastic characteristics of FIG. 11 may be calculated. It can be seen in FIG. 11 that the results of calculation are obtained on the assumption that the number of population parameters is 10,000 and 25% of nodes are Byzantine nodes. It can be seen that, when the average number of congress members to be selected is changed from 10 to 1,000 on the x axis, the number of nodes matching each condition is indicated on the y axis. In FIG. 11, three lines are indicated. The 'min node' line may be regarded as a line in which, when an average of x nodes is selected, the probability that y or fewer nodes will be selected is less than or equal to 1.0000e-6. The '2f+1' line may be regarded as a line in which, when an average of x nodes is selected, 2f+1 nodes are indicated on the y axis. The 'max bzt' line may be regarded as a line in which, when an average of x nodes is selected, the probability that y or more Byzantine nodes will be selected is less than or equal to 3.1710e-17.

In FIG. 11, three cross-points may have the important meaning of becoming a node selection basis. At '2f+1>bzt' cross-point in FIG. 11, when the average number of congress members in an environment in which 25% of nodes are Byzantine nodes is set to an average of less than 101, there may be a probability that a consensus quorum composed only of Byzantine nodes will be formed. Therefore, it can be seen that, when the consensus quorum is fixed at 2f+1, the average number of congress members is configured to be 101 or more.

The 'min>bzt' cross-point in FIG. 11 may mean a start point at which, when an average of x congress members are selected, the minimum number of nodes to be selected becomes greater than the maximum number of Byzantine nodes.

The 'min>2f+1' cross-point in FIG. 11 may be a start point that guarantees that, when an average of x congress members are selected, the probability that the minimum number of congress members is less than or equal to 2f+1 is less than or equal to 1.0000e-6. Assuming that node failure or a packet transfer problem is not present in the network, if the average number of congress members is set to a value equal to or greater than this cross-point, a minimum consensus quorum of 2f+1 or more may secured in each block. When the number of congress members is less than or equal to 2f+1, empty agreement may be performed.

Here, if consensus is achieved only when f+1 consents are obtained in the PREPARE phase and 2f+1 consents are obtained in the COMMIT phase, the reason for obtaining f+1 consents in the PREPARE phase is that Byzantine nodes account for a maximum of 33% of all nodes, and thus when f+1 consents are obtained, a minimum of one normal node may be included in the congress members. As a result, consensus can never be reached using only Byzantine nodes. In the COMMIT phase, 2f+1 consents are required in order to prevent duplicate consensus from being reached.

Referring to FIG. 12, the results of comparing the maximum numbers of Byzantine nodes that can be selected when the number of Byzantine nodes changes from 20% to 35% with values of f+1, 2f+1, 3f+1, and min node are illustrated. In FIG. 12, the x axis indicates the average number of congress members that are randomly selected, and the y axis indicates the number of nodes corresponding to each condition. In an environment in which 20% of nodes are Byzantine nodes, when x is equal to or greater than about 800, the maximum number of Byzantine nodes that may occur always has a value less than f+1. Therefore, it can be seen that when the maximum number of Byzantine nodes is guaranteed to be for lower, SCHEME 1 or SCHEME 2 may be used.

In FIG. 12, when x is equal to or greater than 200, the maximum number of Byzantine nodes is always less than 2f and greater than f in all ranges in which the proportion of Byzantines node changes from 25% to 35%. Accordingly, in the PREPARE phase, f+1 consents are insufficient, and thus f+1 or more consents must be obtained. However, as described above, in this case, finality may be broken.

Figure 13:
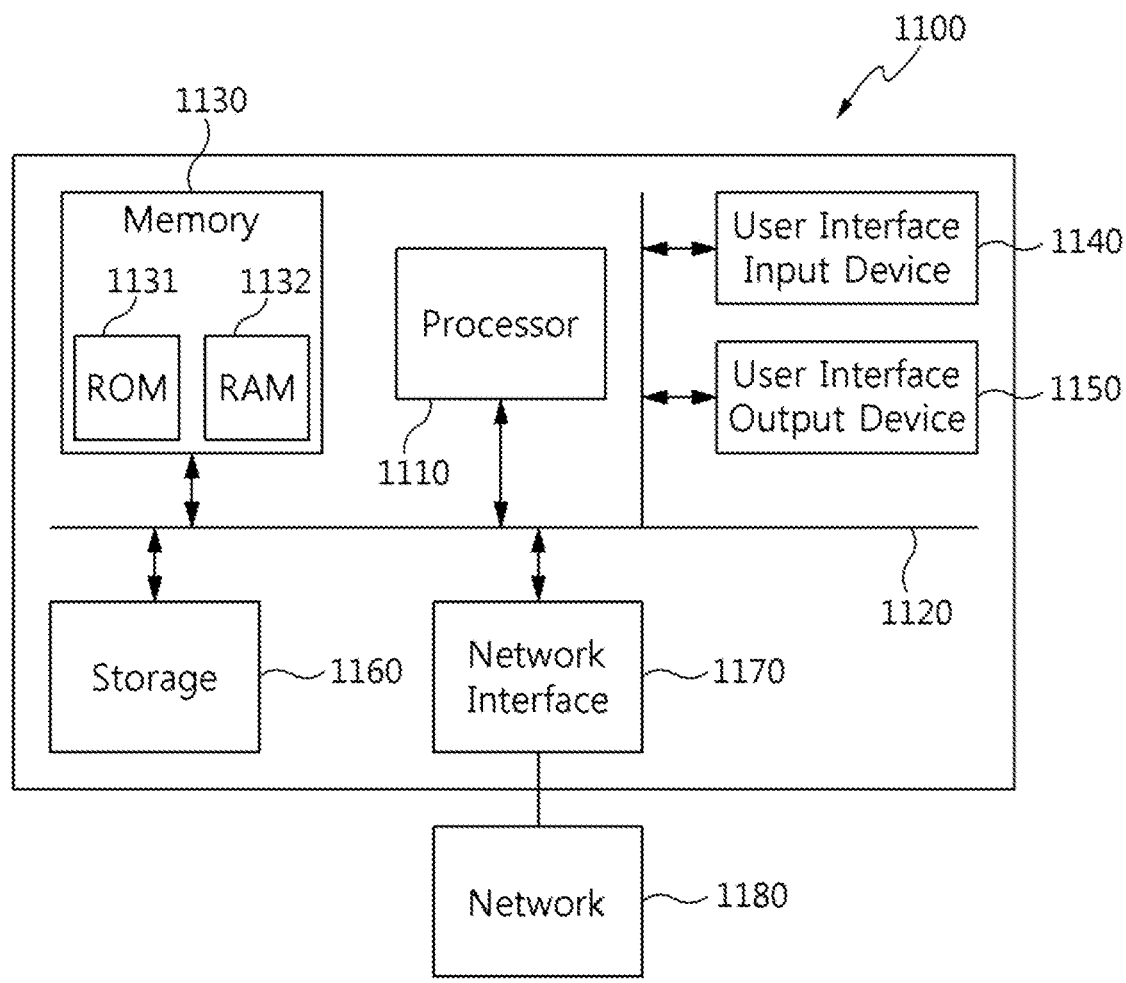
FIG. 13 is a diagram illustrating a computer system according to an embodiment of the present invention.

FIG. 13 is a diagram illustrating a computer system according to an embodiment of the present invention.

Referring to FIG. 13, an apparatus for achieving distributed consensus based on decentralized Byzantine fault tolerance and all nodes in a blockchain according to an embodiment of the present invention may be implemented in a computer system 1100, such as a computer-readable storage medium. As illustrated in FIG. 13, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The apparatus for achieving distributed consensus based on decentralized Byzantine fault tolerance according to an embodiment of the present invention may include one or more processors 1110 and execution memory 1130 for storing at least one program that is executed by the one or more processors 1110, wherein the at least one program is configured to receive delegate request messages, each including a first transaction for requesting distributed consensus proposed by a client, from congress candidate nodes in a blockchain, and determine congress candidate nodes forming a consensus quorum, among the congress candidate nodes, to be consensus nodes based on the delegate request messages, generate a prepare message that includes a second transaction for obtaining consent to results of determination of the consensus nodes from the consensus nodes, and send the prepare message to the consensus nodes, and receive commit messages, each including an electronic signature of a corresponding consensus node, in response to the prepare message from the respective consensus nodes, and broadcast a reply message indicative of results of verification of the electronic signatures included in the commit messages, to the congress candidate nodes, thus completing distributed consensus, wherein the consensus quorum is 2f+1, where f is an integer of 1 or more, f satisfies both a first condition and a second condition, the first condition is a condition satisfied in a case where, when the congress candidate nodes are selected from among all nodes of the blockchain with a probability of p (where p is a real number that is equal to or greater than 0 and is less than or equal to 1), a first probability that a number of Byzantine nodes to be selected as the congress candidate nodes will be greater than f is less than or equal to a preset first reference probability, and the second condition is a condition satisfied in a case where a second probability that a number of congress candidate nodes will be less than or equal to 3f is less than or equal to a preset second reference probability.

Here, the at least one program may be configured to receive the delegate request messages along with next consensus group messages, each including information indicating whether a corresponding node has been selected as the congress candidate node, from all nodes, and when a number of nodes that sent the next consensus group messages is 3f+1 or more, select 3f+1 nodes and determine the selected nodes to be the congress candidate nodes for the next distributed consensus, whereas when the number of nodes that sent the next consensus group messages is less than or equal to 3f, not update the congress candidate nodes.

The at least one program may be configured to, when a number of delegate request messages forming the consensus quorum are received, determine the second transaction based on identical f+1 first transactions included in the delegate request messages forming the consensus quorum.

The at least one program may be configured to generate first bitmap information corresponding to the first transactions of the congress candidate nodes and second bitmap information including the results of determination of the consensus nodes, and to generate the prepare message including the first bitmap information, the second bitmap information, and the second transaction.

Each of the consensus nodes may check a validity of the prepare message based on whether the first bitmap information corresponds to the second transaction.

The at least one program may be configured to generate a first aggregated public key and a first aggregated quorum value by respectively aggregating public keys and quorum values included in the delegate request messages, and to generate the prepare message further including a first hash value obtained by hashing the first aggregated public key and the first aggregated quorum value.

Each of the consensus nodes may be configured to generate a second aggregated public key and a second aggregated quorum value by respectively aggregating previously registered public keys and previously registered quorum values, and to compare a second hash value, obtained by hashing the second aggregated public key and the second aggregated quorum value, with the first hash value as to whether the second hash value is identical to the first hash value, thus checking the validity of the prepare message.

Each of the consensus nodes may be configured to, when the second hash value is identical to the first hash value, generate a signature value including the first hash value and a secret value prestored in the corresponding consensus node, include the signature value in the prepare message, and generate a corresponding commit message by adding the electronic signature based on the signature value to the prepare message.

The at least one program may be configured to generate a multi-signature from the electronic signatures by respectively aggregating the signature values included in the commit messages, public keys of the first aggregated public key, and quorum values of the first aggregated quorum value in a form of a signature value tree of the multi-signature, a public key tree of the multi-signature, and a quorum value tree of the multi-signature.

The at least one program may be configured to, when a result of verification of the multi-signature is true, generate the reply message including the second transaction and the multi-signature.

Further, the apparatus and method for achieving distributed consensus based on decentralized Byzantine fault tolerance according to embodiments of the present invention may achieve a BFT-based distributed consensus through randomly selected nodes, thus enabling BFT consensus to be achieved using decentralized nodes.

Furthermore, the apparatus and method for achieving distributed consensus based on decentralized Byzantine fault tolerance according to embodiments of the present invention are advantageous in that, when nodes are randomly selected and BFT-based consensus is achieved by the nodes, the problem of congress members, such as that in Equation (4), which is not solved by existing PBFT, may be solved.

Furthermore, the apparatus and method for achieving distributed consensus based on decentralized Byzantine fault tolerance according to embodiments of the present invention require the exchange of messages between servers, which has phases increased by one phase from existing MinBFT, but requires only O(N) messages other than O(N) messages in a COMMIT phase, thus enabling consensus to be reached quickly.

Furthermore, the apparatus and method for achieving distributed consensus based on decentralized Byzantine fault tolerance according to embodiments of the present invention require the exchange of O(N) messages, identical to that of existing FastBFT, and decrease the number of message exchange phases by one phase, thus enabling consensus to be reached quickly.

Furthermore, the apparatus and method for achieving distributed consensus based on decentralized Byzantine fault tolerance according to embodiments of the present invention may verify the qualification of nodes to participate in consensus nodes in a DELEGATE REQUEST phase through two hash operations. In this case, the apparatus and method for achieving distributed consensus based on decentralized Byzantine fault tolerance may enable fast operation while preventing unqualified nodes from participating in distributed consensus, thus enabling consensus to be reached quickly even in the presence of a large number of nodes.

The present invention may provide distributed consensus method that allows decentralized nodes to reach consensus through the exchange of O(N) messages while accepting Byzantine fault tolerance (BFT).

Further, the present invention may enable fast computation while reducing the number of messages to be exchanged and preventing unqualified nodes from participating in distributed consensus, thus allowing a large number of decentralized nodes to rapidly reach consensus.

As described above, in the apparatus and method for achieving distributed consensus based on decentralized Byzantine fault tolerance according to the present invention, the configurations and schemes in the above-described embodiments are not limitedly applied, and some or all of the above embodiments can be selectively combined and configured such that various modifications are possible.

What is claimed is:

1. An apparatus for achieving distributed consensus based on decentralized Byzantine fault tolerance, comprising:
   one or more processors; and
   an execution memory for storing at least one program that is executed by the one or more processors,
   wherein the at least one program is configured to:
   receive delegate request messages, each including a first transaction for requesting distributed consensus proposed by a client, from congress candidate nodes in a blockchain, and determine congress candidate nodes forming a consensus quorum, among the congress candidate nodes, to be consensus nodes based on the delegate request messages,
   generate a prepare message that includes a second transaction for obtaining consent to results of determination of the consensus nodes from the consensus nodes, and send the prepare message to the consensus nodes, and
   receive commit messages, each including an electronic signature of a corresponding consensus node, in response to the prepare message from the respective consensus nodes, and broadcast a reply message indicative of results of verification of the electronic signatures included in the commit messages, to the congress candidate nodes, thus completing distributed consensus, wherein the consensus quorum is 2f+1, where f is an integer of 1 or more, wherein f satisfies both a first condition and a second condition, wherein the first condition is a condition satisfied in a case where, when the congress candidate nodes are selected from among all nodes of the blockchain with a probability of p (where p is a real number that is equal to or greater than 0 and is less than or equal to 1), a first probability that a number of Byzantine nodes to be selected as the congress candidate nodes will be greater than f is less than or equal to a preset first reference probability, and wherein the second condition is a condition satisfied in a case where a second probability that a number of congress candidate nodes will be less than or equal to 3f is less than or equal to a preset second reference probability.

2. The apparatus of claim 1, wherein the at least one program is configured to:
receive the delegate request messages along with next consensus group messages, each including information indicating whether a corresponding node has been selected as the congress candidate node, from all nodes, and
when a number of nodes that sent the next consensus group messages is 3f+1 or more, select 3f+1 nodes and determine the selected nodes to be the congress candidate nodes for a next distributed consensus, whereas when the number of nodes that sent the next consensus group messages is less than or equal to 3f, not update the congress candidate nodes.

3. The apparatus of claim 2, wherein the at least one program is configured to, when a number of delegate request messages forming the consensus quorum are received, determine the second transaction based on identical f+1 first transactions included in the delegate request messages forming the consensus quorum.

4. The apparatus of claim 2, wherein the at least one program is configured to generate first bitmap information corresponding to the first transactions of the congress candidate nodes and second bitmap information including the results of determination of the consensus nodes, and to generate the prepare message including the first bitmap information, the second bitmap information, and the second transaction.

5. The apparatus of claim 4, wherein each of the consensus nodes checks a validity of the prepare message based on whether the first bitmap information corresponds to the second transaction.

6. The apparatus of claim 5, wherein the at least one program is configured to generate a first aggregated public key and a first aggregated quorum value by respectively aggregating public keys and quorum values included in the delegate request messages, and to generate the prepare message further including a first hash value obtained by hashing the first aggregated public key and the first aggregated quorum value.

7. The apparatus of claim 6, wherein each of the consensus nodes is configured to generate a second aggregated public key and a second aggregated quorum value by respectively aggregating previously registered public keys and previously registered quorum values, and to compare a second hash value, obtained by hashing the second aggregated public key and the second aggregated quorum value, with the first hash value as to whether the second hash value is identical to the first hash value, thus checking the validity of the prepare message.

8. The apparatus of claim 7, wherein each of the consensus nodes is configured to, when the second hash value is identical to the first hash value, generate a signature value including the first hash value and a secret value prestored in the corresponding consensus node, include the signature value in the prepare message, and generate a corresponding commit message by adding the electronic signature based on the signature value to the prepare message.

9. The apparatus of claim 8, wherein the at least one program is configured to generate a multi-signature from the electronic signatures by respectively aggregating the signature values included in the commit messages, public keys of the first aggregated public key, and quorum values of the first aggregated quorum value in a form of a signature value tree of the multi-signature, a public key tree of the multi-signature, and a quorum value tree of the multi-signature.

10. The apparatus of claim 9, Wherein the at least one program is configured to, when a result of verification of the multi-signature is true, generate the reply message including the second transaction and the multi-signature.

11. A method for achieving distributed consensus based on decentralized Byzantine fault tolerance, the method being performed by an apparatus for achieving distributed consensus based on decentralized Byzantine fault tolerance, the method comprising:
receiving delegate request messages, each including a first transaction for requesting distributed consensus proposed by a client, from congress candidate nodes in a blockchain, and determining congress candidate nodes forming a consensus quorum, among the congress candidate nodes, to be consensus nodes based on the delegate request messages;
generating a prepare message that includes a second transaction for obtaining consent to results of determination of the consensus nodes from the consensus nodes, and sending the prepare message to the consensus nodes; and
receiving commit messages, each including an electronic signature of a corresponding consensus node, in response to the prepare message from the respective consensus nodes, and broadcasting a reply message indicative of results of verification of the electronic signatures included in the commit messages, to the congress candidate nodes, thus completing distributed consensus, wherein the consensus quorum is 2f+1, where f is an integer of 1 or more, wherein f satisfies both a first condition and a second condition, wherein the first condition is a condition satisfied in a case where, when the congress candidate nodes are selected from among all nodes of the blockchain with a probability of p (where p is a real number that is equal to or greater than 0 and is less than or equal to 1), a first probability that a number of Byzantine nodes to be selected as the congress candidate nodes will be greater than f is less than or equal to a preset first reference probability, and wherein the second condition is a condition satisfied in a case where a second probability that a number of congress candidate nodes will be less than or equal to 3f is less than or equal to a preset second reference probability.

12. The method of claim 11, wherein determining the congress candidate nodes to be the consensus nodes is configured to:
    receive the delegate request messages along with next consensus group messages, each including information indicating whether a corresponding node has been selected as the congress candidate node, from all nodes, and
    when a number of nodes that sent the next consensus group messages is 3f+1 or more, select 3f+1 nodes and determine the selected nodes to be the congress candidate nodes for a next distributed consensus, whereas when the number of nodes that sent the next consensus group messages is less than or equal to 3f, not update the congress candidate nodes.

13. The method of claim 12, wherein determining the congress candidate nodes to be the consensus nodes is configured to, when a number of delegate request messages forming the consensus quorum are received, determine the second transaction based on identical f+1 first transactions included in the delegate request messages forming the consensus quorum.

14. The method of claim 12, wherein sending the prepare message is configured to generate first bitmap information corresponding to the first transactions of the congress candidate nodes and second bitmap information including the results of determination of the consensus nodes, and to generate the prepare message including the first bitmap information, the second bitmap information, and the second transaction.

15. The method of claim 14, wherein sending the prepare message is configured such that each of the consensus nodes checks a validity of the prepare message based on whether the first bitmap information corresponds to the second transaction.

16. The method of claim 15, wherein sending the prepare message is configured to generate a first aggregated public key and a first aggregated quorum value by respectively aggregating public keys and quorum values included in the delegate request messages, and to generate the prepare message further including a first hash value obtained by hashing the first aggregated public key and the first aggregated quorum value.

17. The method of claim 16, wherein sending the prepare message is configured to generate a second aggregated public key and a second aggregated quorum value by respectively aggregating previously registered public keys and previously registered quorum values, and to compare a second hash value, obtained by hashing the second aggregated public key and the second aggregated quorum value, with the first hash value as to whether the second hash value is identical to the first hash value, thus checking the validity of the prepare message.

18. The method of claim 17, wherein completing the distributed consensus is configured to, when the second hash value is identical to the first hash value, generate a signature value including the first hash value and a secret value prestored in the corresponding consensus node, include the signature value in the prepare message, and generate a corresponding commit message by adding the electronic signature based on the signature value to the prepare message.

19. The method of claim 18, wherein completing the distributed consensus is configured to generate a multi-signature from the electronic signatures by respectively aggregating the signature values included in the commit messages, public keys of the first aggregated public key, and quorum values of the first aggregated quorum value in a form of a signature value tree of the multi-signature, a public key tree of the multi-signature, and a quorum value tree of the multi-signature.

20. The method of claim 19, wherein completing the distributed consensus is configured to, when a result of verification of the multi-signature is true, generate the reply message including the second transaction and the multi-signature.

* * * * *